United States Patent
Plewe

(10) Patent No.: US 9,213,785 B2
(45) Date of Patent: Dec. 15, 2015

(54) SYSTEMS AND METHODS FOR COMPONENT-BASED ARCHITECTURE DESIGN

(76) Inventor: Thomas Plewe, New York, NY (US)

(*) Notice: Subject to any disclaimer, the term of this patent is extended or adjusted under 35 U.S.C. 154(b) by 986 days.

(21) Appl. No.: 12/693,890

(22) Filed: Jan. 26, 2010

(65) Prior Publication Data

US 2010/0198563 A1    Aug. 5, 2010

Related U.S. Application Data

(60) Provisional application No. 61/149,609, filed on Feb. 3, 2009.

(51) Int. Cl.
| | |
|---|---|
| G06F 17/50 | (2006.01) |
| G06G 7/48 | (2006.01) |
| G06F 17/00 | (2006.01) |
| G06Q 10/00 | (2012.01) |
| G06T 19/20 | (2011.01) |
| G06T 17/00 | (2006.01) |

(52) U.S. Cl.
CPC .......... G06F 17/5004 (2013.01); G06F 17/50 (2013.01); G06F 17/5072 (2013.01); G06F 17/5081 (2013.01); G06F 17/5086 (2013.01); G06T 19/20 (2013.01); G06F 2217/02 (2013.01); G06F 2217/06 (2013.01); G06T 17/00 (2013.01); G06T 2210/04 (2013.01)

(58) Field of Classification Search
CPC . G06F 17/50; G06F 17/5004; G06F 17/5086; G06F 2217/06; G06F 17/5072; G06F 17/5081; G06T 17/00
USPC ............ 703/1, 7; 715/212; 705/301; 716/212
See application file for complete search history.

(56) References Cited

U.S. PATENT DOCUMENTS

| | | |
|---|---|---|
| 6,628,279 B1 | 9/2003 | Schell et al. |
| 6,861,951 B2 | 3/2005 | Reghetti et al. |
| 6,992,575 B2 | 1/2006 | Reghetti et al. |
| 6,999,907 B2 | 2/2006 | Smith |

(Continued)

FOREIGN PATENT DOCUMENTS

| | | | |
|---|---|---|---|
| WO | WO 2005/114495 A1 | 12/2005 | |
| WO | WO 2008/078337 A1 | 7/2008 | |
| WO | WO 2008078337 A1 * | 7/2008 | .............. G06F 17/50 |

OTHER PUBLICATIONS

Chuen-Huei (Joseph) Huang, NPL publication, "Web based BIM for modular house development", ASCAAD 2007.*

(Continued)

*Primary Examiner* — Omar Fernandez Rivas
*Assistant Examiner* — Angel Calle
(74) *Attorney, Agent, or Firm* — Knobbe Martens Olson & Bear LLP

(57) ABSTRACT

Systems and methods are disclosed for performing component-based architecture design. In one example, a method includes accessing a database storing multiple pre-designed room components to automatically identify certain pre-designed room components that satisfy input criteria. Each of the pre-designed room components includes structural geometric data indicative of a three-dimensional (3D) model of a pre-designed room, embedded metadata indicative of at least one design policy associated with the pre-designed room, and construction drawing data that can be merged with that of other room components to create final construction drawings for a completed house design.

19 Claims, 12 Drawing Sheets

(56) References Cited

U.S. PATENT DOCUMENTS

| | | | |
|---|---|---|---|
| 7,019,759 B1 | 3/2006 | Moore et al. | |
| 7,161,478 B2 | 1/2007 | Reghetti et al. | |
| 7,180,411 B2 | 2/2007 | Reghetti et al. | |
| 7,246,044 B2 | 7/2007 | Imamura et al. | |
| 2001/0047251 A1 | 11/2001 | Kemp | |
| 2002/0010522 A1 | 1/2002 | Martin | |
| 2003/0204823 A1* | 10/2003 | Armstrong et al. | 716/2 |
| 2005/0257437 A1 | 11/2005 | Juten et al. | |
| 2006/0217941 A1 | 9/2006 | Soteros | |
| 2007/0157140 A1* | 7/2007 | Holesovsky et al. | 716/5 |
| 2007/0171223 A1 | 7/2007 | McArdle et al. | |
| 2007/0174027 A1* | 7/2007 | Moiseyev | 703/1 |
| 2008/0126023 A1* | 5/2008 | Hoguet | 703/1 |
| 2009/0160856 A1* | 6/2009 | Hoguet | 345/420 |
| 2012/0278047 A1* | 11/2012 | Hoguet | 703/1 |

OTHER PUBLICATIONS

AECbytes, "Bluethink House Designer: Automating the Re-use of Design Knowledge", Jan. 29, 2009.*

A. Ekholm, "Design with architectural objects in industrialised house-building", Sep. 3, 2008.*

Farhi Marir, NPL, "A model Based CAD system integrated with computer applications", Dec. 1998.*

Donath Dirk, NPL, "Integrated planning support system for low income housing", 2001.*

Autodesk Revit Architecture 2010 Questions and Answers, printed from http://usa.autodesk.com/adsk/servlet/pc/index?siteID=123112&id=8479263 on Jan. 25, 2010, 9 pages.

Google Sketchup Product Description, printed from http://sketchup.google.com/product/gsu.html on Jan. 25, 2010, 1 page.

* cited by examiner

SYSTEMS AND METHODS FOR COMPONENT-BASED ARCHITECTURE DESIGN

RELATED APPLICATION

This application claims the benefit of priority under 35 U.S.C. §119(e) of U.S. Provisional Application No. 61/149,609, filed on Feb. 3, 2009, and entitled "SYSTEMS AND METHODS FOR COMPONENT-BASED ARCHITECTURE DESIGN," the entirety of which is hereby incorporated herein by reference to be considered part of this specification.

BACKGROUND

1. Field

Embodiments of the invention generally relate to computer systems and methods for facilitating architecture design and, in particular, to computer systems and methods for providing for component-based architecture design.

2. Description of the Related Art

Home buyers are generally presented with two options when considering a purchase of a new home: tract housing and fully-custom-designed housing. Tract housing has earned its position as the overwhelmingly dominant paradigm of home building and ownership because it is an efficient and cost-effective system. However, many households have a less-than-perfect fit with their tract home. For example, a tract house can have a particular space that a household would not use (e.g., an extra bathroom), which necessarily results in a sacrifice of some other asset that could have benefited them more (e.g., more living room space). In addition, tract housing developments consist of a limited set of very-similar home models and allow limited to no flexibility in customization of home design.

Fully-custom-designed housing has provable benefits over a tract housing approach, but has remained unreachable for the vast majority of home buyers due to the cost, time, hassle, and the disadvantages of its inefficient production systems. Only very wealthy families can consider building a house with features and spaces that are actually customized to their needs.

SUMMARY

In view of the foregoing, what is needed are systems and methods for providing component-based architecture design generated from a plurality of pre-designed room components. For example, a need exists for facilitating the design of a home with similar costs as the tract housing system while offering considerable gains in customization.

In certain embodiments, systems and methods are disclosed for performing component-based architecture design. For instance, certain embodiments generally relate to the design of residential structures using components that represent entire rooms or a combination of rooms instead of floor or wall-section components, as used in existing prefab construction systems. In certain embodiments, these "room" components are pre-designed and stored in a centralized database but are not pre-manufactured or pre-fabricated in a completed form. As a result, certain embodiments advantageously allow an architect or other individual to meet with a client, determine his/her housing needs, and search the database of pre-designed room components in order to select, for example, two to four pre-designed room components to be used in the design of a complete, customized residential structure. In certain embodiments, the pre-designed room components can be designed by the same or different architects.

Moreover, following the process of searching for and selecting pre-designed room components, embodiments of the invention allow the architect to arrange the room components in a building-block fashion, such as by stacking or connecting them together, after which the room components are automatically merged together to create a final, customized design. During this arranging process and upon its completion, embodiments of the invention provide feedback to the architect about details of the combined house design including, but not limited to, square footage, construction cost, construction time, operating expenses, user ratings, and expected duration, based on combinations of the values of these details embedded within each individual room component. Upon completion of the final house design, embodiments of the invention can automatically generate construction drawings for the complete house based on construction drawing geometry and data embedded within each room component.

In certain embodiments, a completely unique house can be fully designed by an architect with complete construction drawings after only a few hours of meeting with a client. For example, the customized house can be created based simply on a search of the centralized database of room components, selection of one or more desired pre-designed room components, and manipulation of geometric models of the room components on a graphical user interface (such as "dragging" the room components within a workspace in a three-dimensional environment) of a display.

In certain embodiments, a method for creating customized architectural designs includes receiving input criteria associated with architectural design preferences of a user. The method also includes accessing at least one database storing a plurality of pre-designed room components to automatically identify certain ones of the pre-designed room components that satisfy the input criteria, each of the pre-designed room components further including structural data indicative of a three-dimensional (3D) model of a pre-designed room, embedded information indicative of at least one design policy associated with the pre-designed room component, and construction drawings data indicative of the floor plan of the pre-designed room. The method further includes receiving input associated with selected ones of the identified pre-designed room components and loading the 3D models of each of the selected pre-designed room components into a workspace of a user interface. Moreover, the method includes receiving input regarding a desired arrangement of the 3D models.

In some embodiments, the method includes determining, based on the embedded information of the selected pre-designed room components, if the desired arrangement of the 3D models violates the at least one design policy and when the desired arrangement of the 3D models violates the at least one design policy, generating an alert identifying the violated design policy; and when the desired arrangement of the 3D models does not violate the at least one design policy, arranging the 3D models based on the received input regarding the desired arrangement.

In certain embodiments, a system for component-based architectural design includes a centralized database of pre-designed room components. The pre-designed room components can include structural data indicative of a 3D model of a pre-designed room, embedded information indicative of at least one design policy associated with the pre-designed room component, and construction plan drawings data indicative of the floor plan of the pre-designed room. The system also includes a server configured to communicate with a client computer over a network. In some embodiments, the server is configured to receive input criteria associated with architectural design preferences of a user and to access the centralized database to automatically identify certain ones of the pre-designed room components that satisfy the input criteria.

The server can also be configured to receive input associated with selected ones of the identified pre-designed room components and to transmit the 3D models of each of the selected pre-designed room components to the client computer for loading within a workspace of a user interface. The server can further be configured to receive input regarding a desired arrangement of the 3D models within the workspace and to determine, based on the embedded information of the selected pre-designed room components, if the desired arrangement of the 3D models violates the at least one design policy. When the desired arrangement of the 3D models violates the at least one design policy, the server can be configured to generate an alert identifying the violated design policy. When the desired arrangement of the 3D models does not violate the at least one design policy, the server can be configured to arrange the 3D models based on the received input regarding the desired arrangement.

In certain embodiments, a computer system for component-based architectural design comprises a database of pre-designed room components, each of the pre-designed room components further comprising structural data indicative of a 3D model of a pre-designed room, embedded information indicative of at least one design policy associated with the pre-designed room component and construction drawings geometry and data indicative of the floor plan of the pre-designed room. The computer system also includes a processor programmed to implement the following modules: a pre-designed room component search module configured to receive input criteria associated with architectural design preferences of a user and to access the database to automatically identify certain ones of the pre-designed room components that satisfy the input criteria; a component combination module configured to receive input associated with selected ones of the identified pre-designed room components and to load the 3D models of each of the selected pre-designed room components into a workspace of a user interface; and a verification module configured to receive input regarding a desired arrangement of the 3D models and to determine, based on the embedded information of the selected pre-designed room components, if the desired arrangement of the 3D models violates the at least one design policy.

In certain embodiments, when the desired arrangement of the 3D models violates the at least one design policy, the verification module is configured to generate an alert identifying the violated design policy; and when the desired arrangement of the 3D models does not violate the at least one design policy, the component combination module is configured to arrange the 3D models based on the received input regarding the desired arrangement.

For purposes of summarizing the disclosure, certain aspects, advantages, and novel features have been described herein. It is to be understood that not necessarily all such advantages may be achieved in accordance with any particular embodiment of the invention. Thus, embodiments of the invention may be embodied or carried out in a manner that achieves or optimizes one advantage or group of advantages as taught herein without necessarily achieving other advantages as may be taught or suggested herein.

DETAILED DESCRIPTION

Figure 1:
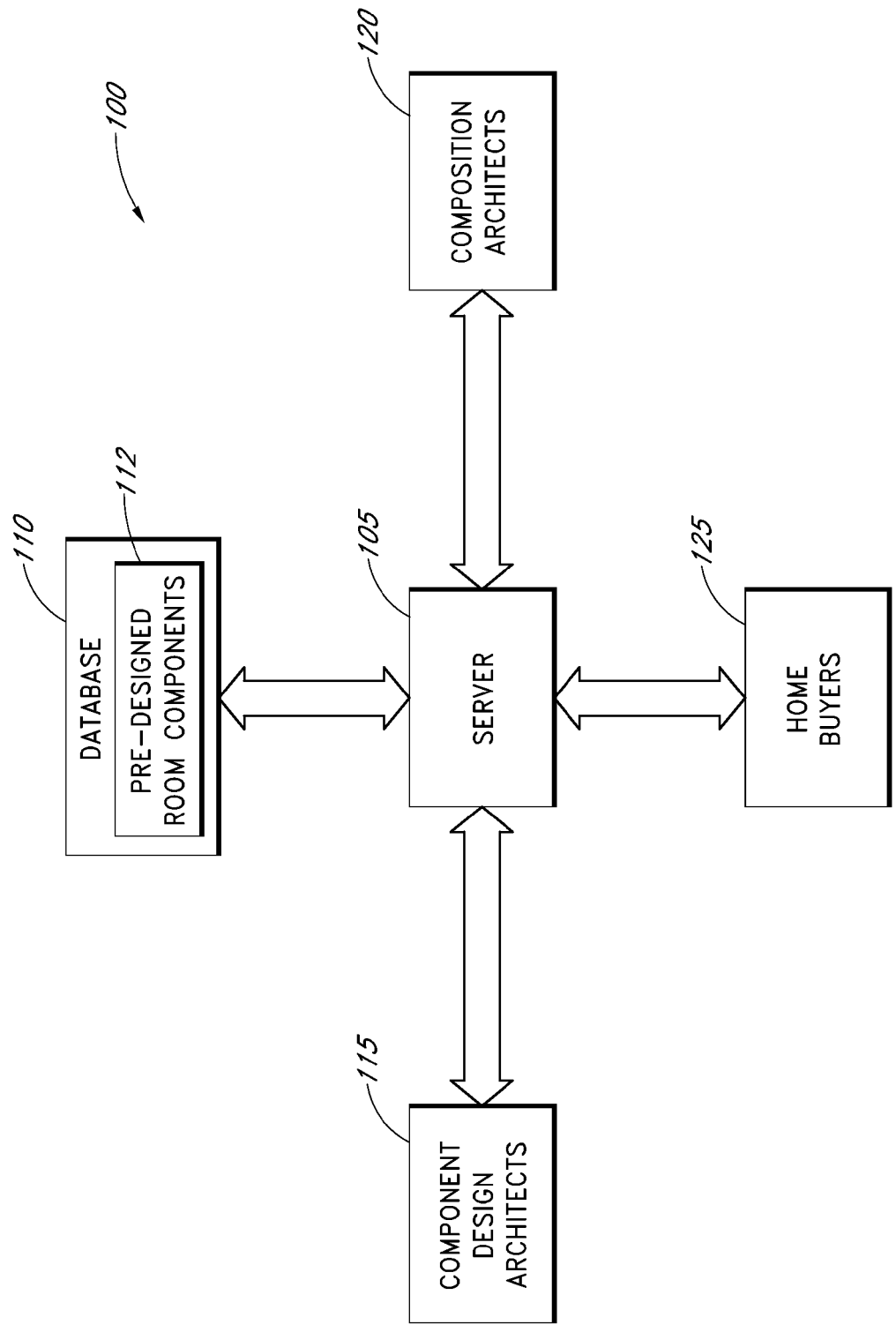
FIG. 1 illustrates a schematic block diagram of a component-based housing design system according to an embodiment of the invention.

The following disclosure describes non-limiting examples of some embodiments of the invention. For instance, other embodiments of the disclosed systems and methods may or may not include the features described herein. Moreover, disclosed advantages and benefits may apply to only certain embodiments of the invention and should not be used to limit the disclosure.

In certain embodiments of the invention, systems and methods are disclosed herein for performing component-based architecture design. The term "component" as used herein is a broad term and is used in its ordinary sense and includes, without limitation, any self-contained unit, or module, of an architectural structure.

The term "room component" as used herein is a broad term and is used in its ordinary sense and includes, without limitation, components that represent entire self-contained or stand-alone rooms or room modules, or any combination of rooms. The term "room component" can include spaces or areas not ordinarily referred to as "rooms." For example, a "room component" can include any one or more of any of the following, or any combinations thereof: patio, porch, garage, courtyard, kitchen, bedroom, bathroom, studio, loft, office, dining room, living room, family room, hall, stairway, entry, utility, storage, attic, basement, closet, home theater, game room, alcove, niche, nook, suite, and den.

The term "pre-designed" as used herein is a broad term and is used in its ordinary sense and refers, without limitation, to room components designed by an architect prior to a composition phase, wherein a composition architect creates a three-dimensional (3D) model of a complete house from multiple pre-designed room component models. Although the term "room component" may be used herein without the "pre-designed" modifier for simplicity, the term "room component" can be interpreted as "pre-designed room component."

The systems and methods disclosed herein can be used to divide and diffuse the architectural design process in an object-oriented manner, so that design work can be reused as much as possible. In certain embodiments, the inventive systems and methods can focus on digital design as opposed to construction.

In certain embodiments, implementation of the methods for component-based housing design occurs in two phases: the pre-design phase and the composition phase. In the pre-design phase, 3D models of single room and/or multi-room components can be designed by individual design architects using 3D modeling software, such as computer-aided design (CAD) software. For example, one room component can include three bedrooms and a bathroom. Another room component can include a master suite and a living area. Each room component can be fully designed by a design architect and can be uploaded to a centralized database as a standardized digital file. In certain embodiments, the room components are pre-designed, but not pre-manufactured or pre-fabricated.

In certain embodiments, the pre-designed room components include embedded information (e.g., metadata defining attributes, properties, parameters, and/or construction drawing data). In some embodiments, the embedded information can be modified and/or adjusted by a composition architect during the composition phase. Examples of "adjustable" embedded information include dimensions, identification information (e.g., the type of room component or designer identification), interaction information (e.g., the portions of the room component that can mate with other room components and the types of room components that the pre-designed room component can mate with), composition materials, surface finishes (e.g., exterior brick, stone, or the like, or interior flooring), and/or other aesthetic properties.

In some embodiments, the embedded information includes attributes or characteristics that cannot be modified and/or adjusted by a composition architect during the composition phase. This "non-adjustable" embedded information can include inherent characteristics, such as energy usage data, or unmodifiable structural features, such as fixed boundaries or safety features. In certain embodiments, the "non-adjustable" embedded information includes wiring schemes, piping schemes, and/or construction information (e.g., material types, costs, actual manner of construction). In certain embodiments, while this "non-adjustable" information is not directly editable during the composition phase, it can be updated automatically when related, editable parameters (for example, dimensions) are adjusted.

The composition phase can include receiving input from a client (e.g., home buyer), searching for and selecting various pre-designed room components, loading 3D models of the selected pre-designed room components, and arranging and merging the pre-designed room components in a customized manner to create a unified, completed architectural design. The merging of the pre-designed room components can include automatic merging of the detailed embedded information, or metadata, associated with each room component. Detailed construction drawings can be generated from the completed design based upon the merging of the construction drawing data of each of the individual room components used in the final design.

The features of the systems and methods will now be described with reference to the drawings summarized above. Throughout the drawings, reference numbers may be re-used to indicate correspondence between referenced elements. The drawings, associated descriptions, and specific implementation are provided to illustrate embodiments of the invention and not to limit the scope of the disclosure.

In addition, methods and processes described herein are not limited to any particular sequence, and the blocks or states relating thereto can be performed in other sequences that are appropriate. For example, described blocks or states can be performed in an order other than that specifically disclosed, or multiple blocks or states can be combined in a single block or state.

Although the disclosure herein provides several examples of embodiments of the invention pertaining to residential housing design, other embodiments of the invention can be used with various other types of structures and/or architecture designs, including, but not limited to the design of: buildings, retail buildings, commercial buildings, warehouses, apartments, condominiums, townhouses, offices, boats, cruise ships, stores, schools, airports, suites, hotels, restaurants, convention centers, malls, parking structures, combinations of the same or the like.

FIG. 1 illustrates a block diagram of an embodiment of a component-based housing design system 100. In certain embodiments, the component-based housing design system 100 enables users to design a customized house by arranging and merging pre-designed room components, as selected from a searchable database, and to generate construction drawings that can be used to build the completed, customized house design.

As shown in FIG. 1, the component-based housing design system 100 includes a centralized server 105. In certain embodiments, the server 105 comprises a centralized searchable location, such as a single collection server. In other embodiments, the server 105 comprises multiple computers located proximate or remote to each other (e.g., deployed to provide scalability). The server 105 can comprise a web server and/or a database server. As shown in FIG. 1, the server 105 communicates with a component database 110, component design architects 115, composition architects 120, and home buyers 125. The component database 110 can include multiple different pre-designed room component models 112 designed by multiple different component design architects 115.

The component design architects 115, the composition architects 120 and the home buyers 125 can interact with the server 105 using one or more computing devices in communication with the server 105 over a network. The one or more computing devices may comprise any type of computing device, such as, for example, a network computer, a server, a portable digital assistant, a workstation, a smartphone, a laptop, a virtual device, or the like. The network may comprise, for example, an Internet-based network, a token ring or TCP/IP based network, a wide area network (WAN), a local area network (LAN), an intranet network, combinations of the same or the like.

In certain embodiments, the server 105 comprises one or more computers configured to host a web site that is accessible via the World Wide Web by other computing devices through a web browser. Various forms of central or distributed communication mechanisms can be used, including file transfer protocol, hypertext transfer protocol, extensible markup language (XML) and electronic mail data transfers.

The web site can optionally employ encryption (e.g., using HTTP secure protocol and/or Internet Protocol Security). The web site can require login credentials, such as a username and password, to enable access. In certain embodiments, various entities can have different levels of access to the web site and its associated programs and/or features. For example, the home buyers 125 may be able to search for, and/or browse images or models of, the pre-designed room component models 112, but may not be able to download the full component model files to their local computers from the server 105 or access composition on or from the server 105. The composition architects 120 may have full access to the web site and may be able to download the pre-designed room component models 112 to their local computers and/or access composition software on or from the server 105.

In certain embodiments, the component design architects 115 carry out the pre-design phase of the component-based housing design methods. The component design architects 115 design stand-alone 3D room components (e.g., single-room, multi-room components), including embedded information or accompanying meta-data, and transmit (e.g., upload) the room components to the server 105. The server 105 stores one or more pre-designed room components 112 received from the component design architects 115 in the component database 110. In certain embodiments, the component design architects 115 are required to create an account and/or otherwise register with the web site before they can upload their pre-designed room components. The component design architects 115 may be required to pay a registration fee and/or to provide proof of adequate training or certification in component designing.

In certain embodiments, the server 105 comprises a screening module that pre-screens the uploaded pre-designed room components 112 for quality control and rejects any non-compliant submissions. The models of the pre-designed room components 112 can be created, for example using CAD software, and accompanying xml files can be created to store the room component meta-data. The various spaces or areas forming a particular pre-designed room component can be chosen by the component design architects 115, for example, based on scale, quality, living/working separation, physical proximity, architectural style, and/or the like. In certain embodiments, what constitutes a "room component" can be wholly determined by the component design architects 115.

In certain embodiments, the home buyers 125 browse the pre-designed room components prior to meeting with the composition architects 120 to determine the room components that the home buyers 125 may be interested in using to design their home. As discussed above, the home buyers 125 can be prevented from downloading the full pre-designed component model files, but may be able to preview representative images of the pre-designed components 112 submitted by the component design architects 115. In certain embodiments, the home buyers 125 can view 3D representations of the pre-designed component models 112 via a web browser and/or can view photographs of the pre-designed room components as used in previous houses.

In certain embodiments, indirect links or relationships allow the various entities (e.g., home buyers, component design architects, composition architects) to communicate with each other independently of the server 105. For example, because the home buyers 125 may not be able to download the full pre-designed room components 112 or have access to 3D composition software residing on the server 105 or available for download to a client computer, the home buyers 125 can visit the office of a composition architect 120 to carry out the design phase.

The composition architects 120 can download one or more pre-designed room component models 112 from the database 110 via the server 105 for use in generating a complete architectural design, such as a house design. In certain embodiments, the pre-designed room component models 112 can be selected by the composition architect 120 based at least partly on input from the home buyers 125. In certain embodiments, the home buyers 125 tell the composition architect 120 the particular pre-designed room component models 112 that they would like to use based on a search of the room component models conducted beforehand. In other embodiments, the home buyers 125 can describe their needs and/or preferences to the composition architect 120, who can then create a conception of a suitable customized house based on the needs and/or preferences of the home buyers 125 and then search for suitable room components.

In other embodiments, the home buyers 125 can fill out a questionnaire or survey to provide their needs and/or preferences to the composition architect 120. The questionnaire or survey can be completed electronically (e.g., via the server 105) or by hand (e.g., in the architect's office).

In certain embodiments, the preferences are reflective of architectural preferences. In other embodiments, the preferences are reflective of lifestyle preferences. In still other embodiments, the preferences are reflective of aesthetic and/or cost preferences.

For example, if the home buyers 125 are a young artist couple with a small child, they may express to the composition architect 120 that they want a house with a small but modern living and kitchen area, a nice master bedroom and bath, and a very large studio space whose quality is less important than its size. The composition architect 120 can use this information to determine that the living, kitchen, bedroom and bath areas could be thought of as one room component (for example, because what the couple is looking for in each of those areas is similar in relative scale and quality) and the large studio space could be thought of as its own room component (for example, because the size of the studio is much more important than the quality).

Figure 7:
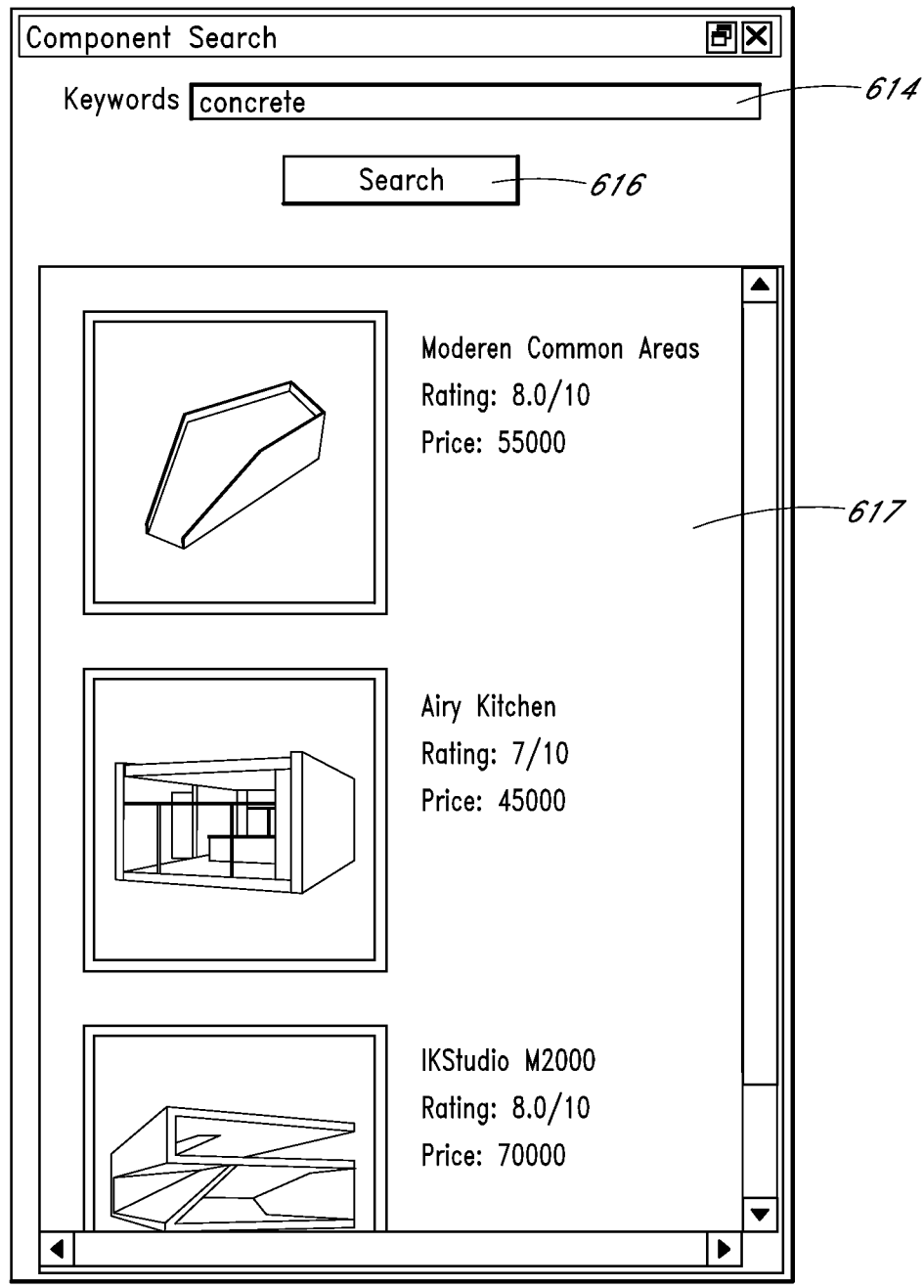
FIG. 7 illustrates an embodiment of a search window of the user interface of FIG. 6.

The composition architect 120 can search for pre-designed room components 112 that match his or her conception by entering search terms in a search interface (an example of which is illustrated in FIG. 7). The search terms can be reflective of the preferences received from the home buyers 125. In certain embodiments, the composition architects 120 can choose to only use pre-designed room components 112 of their own design. The composition architects 120 may be required to register with the web site and/or pay a registration fee in order to access the database 110 of pre-designed room components 112 and/or to access the composition software provided on the server 105 or made available for download to a client computer. The web site may require the composition architects 120 to enter login credentials in order to provide tracking and/or verification features (e.g., for billing purposes).

Figure 2:
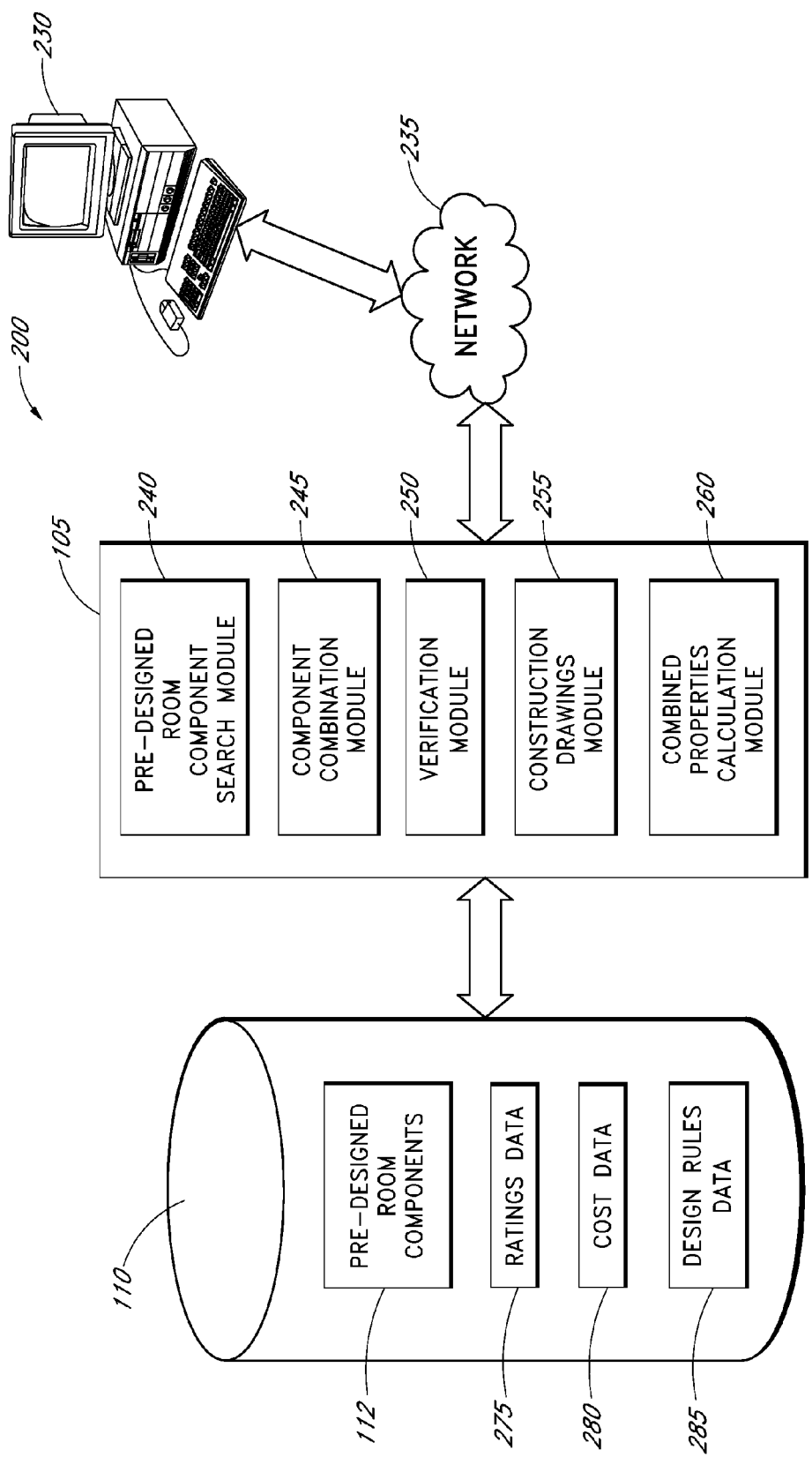
FIG. 2 illustrates a schematic block diagram of a server-centered implementation of the component-based housing design system of FIG. 1.

In certain embodiments, a component-based housing design system 200 is implemented using an application service provider-type model (as shown in FIG. 2). For example, the composition software and the database 110 can reside on the server 105 (e.g., a web server) and can be accessed by the composition architects 120 using a web browser on a remote computer 230 connected to the server 105 via a network 235. The composition software can be distributed or located at a unitary site.

Figure 3:
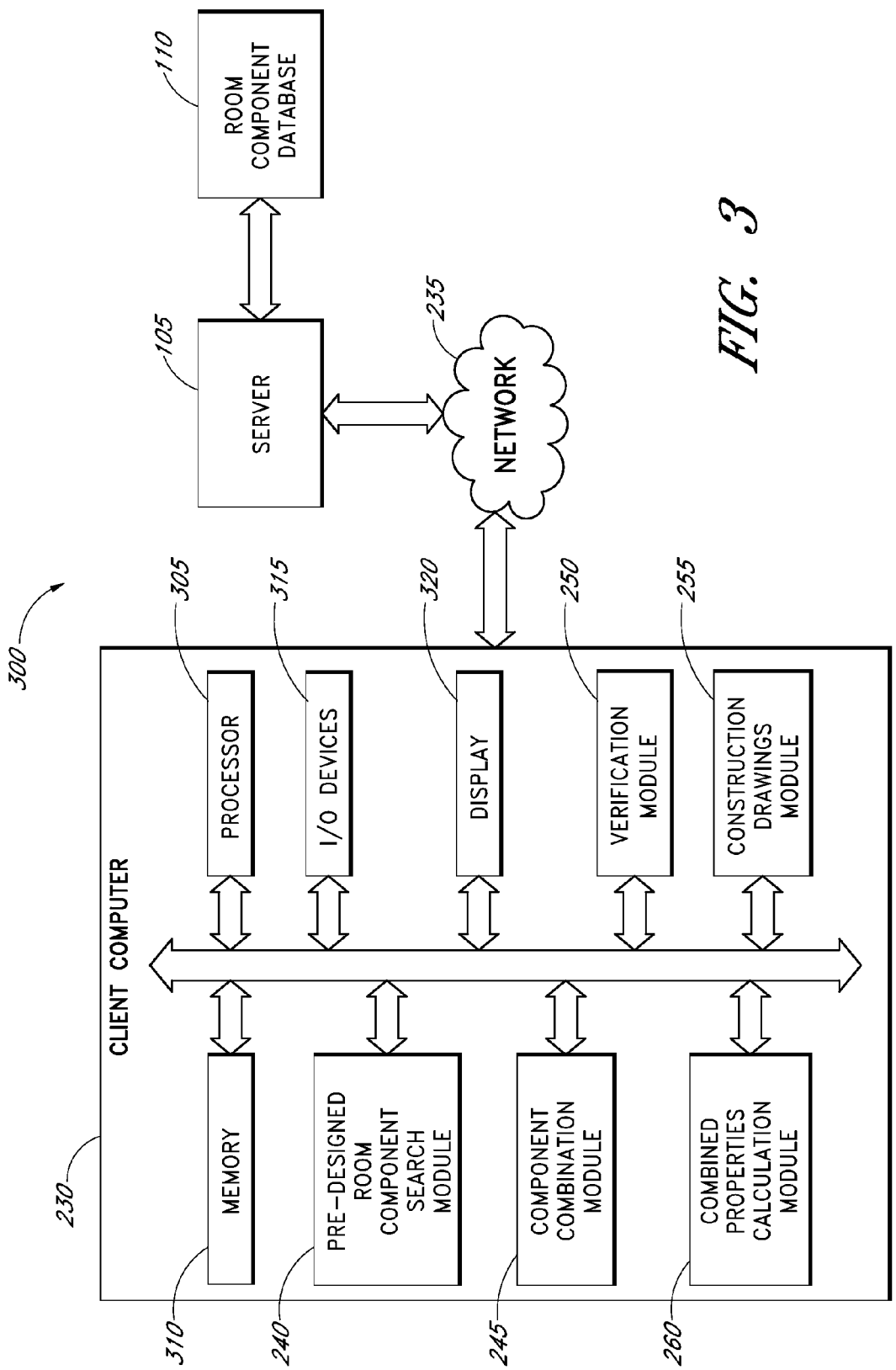
FIG. 3 illustrates a schematic block diagram of a client-centered implementation of the component-based housing design system of FIG. 1.

In alternative embodiments, a component-based housing design system 300 is implemented such that the composition software is installed and run on remote client computers and not on a centralized server (as shown in FIG. 3). For example, the composition software can be installed and reside in memory on remote computers 230 located at the offices of the composition architects 120. The remote computers 230 can access the component database 110 via the network 235. In certain embodiments, the remote computers 230 can store an internal database of pre-designed room components in local memory that can be loaded upon startup of the composition software. The remote computers 230 may periodically connect to the web site hosted by the server 105 to receive updates and/or additions to the internal database of pre-designed room components.

With reference to FIG. 2, the component database 110 can include a master database file folder, which includes a plurality of files, with one or more files for each pre-designed room component 112 in the database 110. In other embodiments, the component database 110 comprises a monolithic structured query language (SQL) database rather than individual database files. In certain embodiments, the database files comprise digital files, such as XML files or the like. For example, a database.xml file can act as a master database file by listing the following XML component files, each comprising embedded information for a pre-designed room component:

```
<component file="beds.xml">
<component file="living_beds.xml">
<component file="kitchen_dining.xml">
<component file="kitchen_dining_beds.xml">
<component file="kitchen_dining_patio_utility.xml">
<component file="living_porch.xml">
<component file="living_porch_kitchen_dining.xml">
<component file="loft.xml">
<component file="patio.xml">
<component file="patio_studio_utility.xml">
<component file="patio_utility.xml">
<component file="studio.xml">
<component file="studio_loft.xml">
<component file="studio_utility_loft.xml">
<component file="stairs.xml">
<component file="kitchen1.xml">
```

In certain embodiments, each pre-designed room component in the component database 110 can include 3D model data for viewing and manipulating in a graphical user interface and/or embedded information, or metadata, at least some of which is "hidden" from the user but that enables the interaction and merging of the room component with other room components and that defines properties, parameters, options, and/or attributes of the room component. In certain embodiments, the "hidden" metadata includes construction drawing geometry and data. As the 3D models of the room components are merged together by the composition architect 120 in the graphical user interface, the composition software merges the correlated metadata (including the construction drawing geometry and data) of the pre-designed room components as well.

In certain embodiments, each pre-designed room component model 112 includes a descriptor file (e.g. in .xml format), a 3D model file (e.g. in .obj and .mtl format), and a preview image file (e.g. in .jpg format).

The 3D model file can include 3D structural data indicative of the geometry of the 3D model of the pre-designed room component. In certain embodiments, the 3D structural data defines how the room component is viewed and manipulated by the composition architect 120 during the composition phase. In certain embodiments, the 3D model file can include additional geometry which can be used to generate construction drawings. The geometry to be used to create construction drawings can be hidden from the composition architect 120 based on metadata contained in the xml descriptor file. The construction drawing geometry and data of the pre-designed room component can be merged with that of other room components to create final construction drawings for the completed house design (potentially including wiring, pipes, HVAC, and the like).

The descriptor file can list the files or data that define the component (e.g. 3D model files and image preview files) and include metadata (e.g., XML tags) that define options, attributes, and/or properties of the room component (such as properties metadata, search terms metadata, interaction data, parametric adjustment metadata, and the like). For example, metadata can be established by the component design architect 115 as structural or aesthetic options (e.g., flooring type/materials) that can be selectable by the composition architect 120. In certain embodiments, the metadata can specify attributes for the component (square footage, energy use, cost, etc. that come from a combination of being specified by the component design architect and from feedback from user reviews and reports of actual construction and ownership costs, etc.). In certain embodiments, the descriptor file sets up the correlation between the 3D structural data and the construction drawing geometry and data of the 3D model file, such that adjusting one can correspondingly adjust the other.

In certain embodiments, the descriptor file can be manually created by the design architect 115. In other embodiments, at least some data within the descriptor file is automatically generated by a special 3D model file exported from custom modeling software or automatically modified using data collected over time from use of each room component. In certain embodiments, some data in the descriptor file is adjusted by the component design architect 115 post design and other data cannot be accessed and/or modified by the component design architect 115 (e.g., user ratings information in the properties data).

As discussed above, the metadata can specify attributes, or properties, of the room component. The properties metadata can include information such as design architect identification, identification of the rooms contained within the room component, construction details, orientation properties, wiring information, plumbing information, parameter guidelines information, square footage information, energy usage information, cost information, ratings information (e.g., aggregate user rating), materials data, other structural data, and the like.

In certain embodiments, each of the pre-designed room components 112 can include metadata indicative of compliance with design rules. For example, a component design architect 115 can submit the design of his room component to a certain city/county/state and have it pre-approved as meeting safety code or design requirements for that particular region and the pre-designed room component can include metadata specifying the zip codes, city names, GPS coordinates, or other location identifier in which the component has already been pre-approved. In other embodiments, the metadata can be updated by the component design architect 115 or the composition architect 120 during actual construction of the room component (e.g., an indication that the plumbing layout of the pre-designed room component has passed inspection upon being built). In certain embodiments, the properties metadata can include information regarding pre-approval of the component design In certain embodiments, at least some of these properties of the room component can be displayed next to a thumbnail in the search results window (as will be described further below), and can be used by the composition software to calculate aggregate data for the entire unified house structure during and at the completion of the component selection and composition phase. In certain embodiments, the properties metadata can include various options of properties established by the component design architect 115 and selectable by the composition architect 120.

The metadata can also include a list of the search terms that would cause the room component to appear as a result of a search query of the component database 110. In certain embodiments, the search terms are manually entered by the design architect 115. For example, if the design architect 115 creates a room component consisting of two bedrooms and two bathrooms, which is designed for modern concrete construction, she might want to include the words "bed," "bath," "modern," and "concrete" as search terms relevant to the room component. In other embodiments, the search terms are automatically pulled or extracted from the design architect's description of the component, user reviews, and/or other data sources.

In certain embodiments, if a user searches for multiple terms, only room components matching all terms will be returned as results to the query. For example, if the user enters the search query "bed bath modern concrete," the room component described above will be shown as a result, along with any other pre-designed room components including the terms of the search query. In other embodiments, room components matching any one of the terms entered are returned, with the results ranked in order of relevance, popularity (e.g., based on user reviews), date created, or other attributes/properties.

In certain embodiments, the metadata includes interaction metadata that defines the exterior surface of the room component as well as the space within the room component. For example, the interaction metadata can specify the wall width of the room component. The interaction metadata can also include parameter criteria indicative of at least one design policy associated with the pre-designed room component. In certain embodiments, the interaction metadata includes connection or interaction properties that define how and where room components can be connected to other room components. The interaction metadata can identify or delineate which walls or other boundary elements of the pre-designed room component can be snapped to and merged with a wall or other boundary element of another room component.

For example, a room component can include a parameter criterion that indicates that a wall or other structural element of the room component can only merge with another wall or structural element of a similar construction or made of a similar construction material and/or having common dimensions. In other embodiments, a room component can include a parameter criterion that indicates that a particular wall or structural boundary element of a room component cannot be merged with any other room component. In certain embodiments, the interaction metadata specifies that the ceiling of the room component can be merged with the floor of another room component or that the floor of the room component can be merged with the ceiling of another room component.

In certain embodiments, each wall or other structural boundary element of the room component is tied to a single hidden polygon. This polygon is set in the room component's metadata to correspond with the multiple 3D polygons that make up the wall or other structural boundary element that the composition architect 120 sees when using the composition software, as well as corresponding hidden construction drawing geometry and data. This single polygon is used to aid the software in the snapping, merging, and properties calculation process. The snapping and/or merging of neighboring room components together will be discussed in further detail in connection with FIG. 8B.

The metadata can also include parametric adjustment metadata that allow the room components, or sub-components of the room-components (e.g., doors, windows, ceilings), to change their shape and/or size within certain tolerances. The parametric adjustment metadata allows the component design architect 115 to identify vertices of the 3D model that can be adjusted parametrically by sliding (e.g., stretching or compressing) along a specified vector or set of vectors. For example, if a component design architect 115 desires to create a doorway having variable width, he/she can include parametric adjustment metadata that enables all of the vertices on one side of the doorway, as well as any corresponding hidden vertices, to slide along a horizontal vector in the plane of the wall.

Figure 8A:
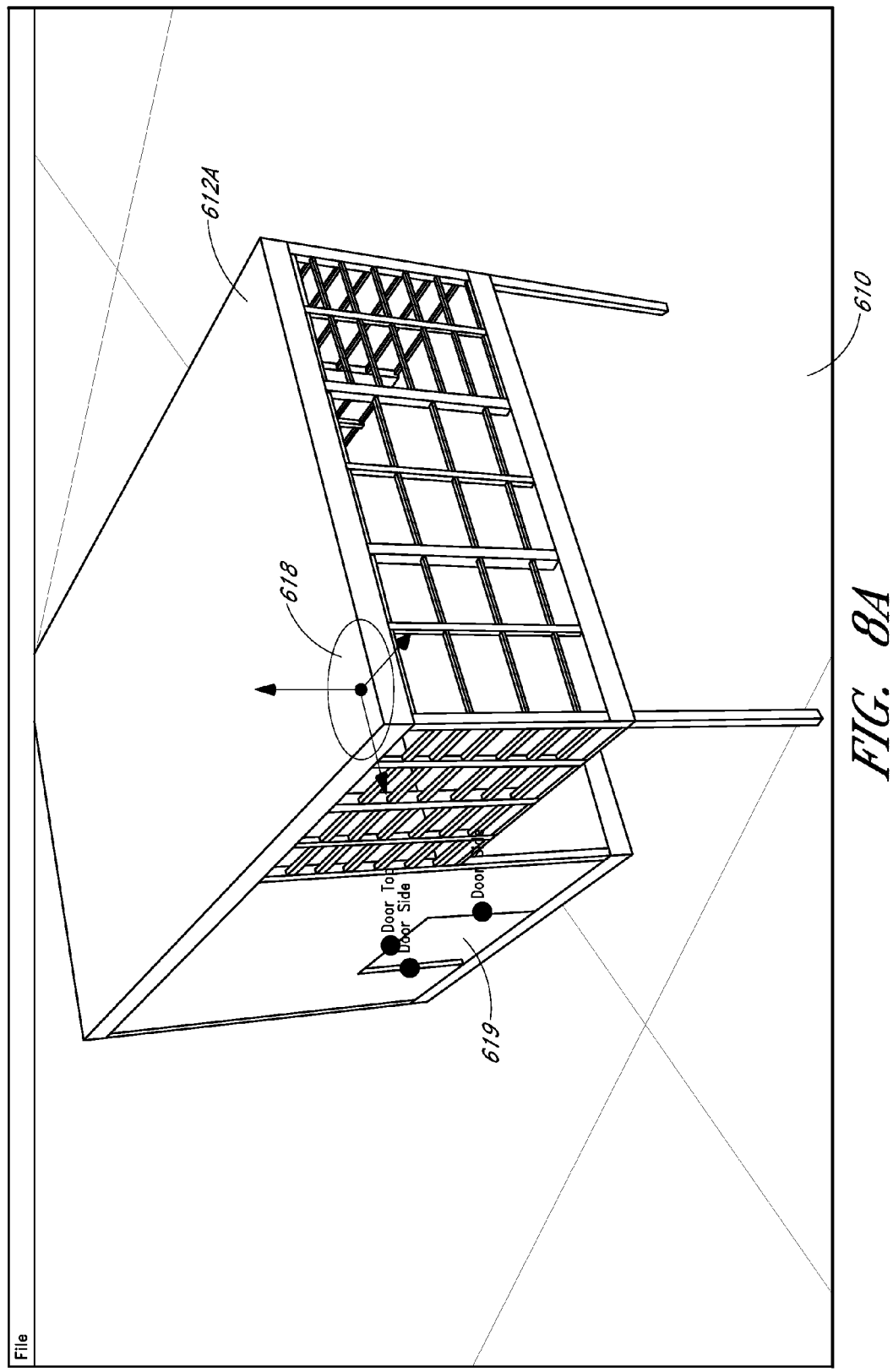
FIG. 8A illustrates an embodiment of a three-dimensional multi-room component model loaded into a workspace of the user interface of FIG. 6 for manipulation and/or customization.

The parametric adjustment metadata can include the name of the parameter, the index of the shape in the 3D model file that is affected, the set of vertices that will move, the vector or set of vectors that the vertices can move along, and/or the set of vertices used to position a control handle for the composition architect 120 to grab in the user interface (as shown in FIG. 8A). An example of a parametric adjustment XML tag including parametric adjustment data is represented by the slider tag in the example XML descriptor file below.

In certain embodiments, the descriptor file includes embedded information, or metadata, that specifies a correlation between the construction drawing geometry and data and the 3D geometry data of the 3D model file such that if the composition architect changes the 3D model, the underlying construction drawing geometry and data are also changed. For example, as shown in the plan tag of the example descriptor file below, the descriptor file includes a list of polygons that can be used to generate the floor plan of the pre-designed room component. These polygons (e.g., construction drawing geometry) can be included in the 3D model file in addition to the geometry of the component itself, and can be hidden by the 3D composition software when displaying the component in the 3D workspace of the user interface of FIG. 5. The slider tag identifies vertices in both the visible 3D model polygons as well as the hidden construction drawing geometry polygons that can all move together when the composition architect 120 adjusts the corresponding parameter. In certain embodiments, the polygons represent simplified versions of walls or other structural boundary elements for easy manipulation by the composition architect 120.

As an example, an XML descriptor file accompanying a 3D model file for a pre-designed room component containing two bedrooms and one bathroom is reproduced below:

```
<files>
    <data 3dmodel="beds.obj">
    <data thumbnail="beds.jpg">
</files>
<properties>
    <data rating="7.5/10">
    <data bed="2">
    <data bath="1">
    <data name="Eames Bedrooms">
    <data price="30000">
</properties>
<search>
    <data terms="eames case study bedrooms beds bath">
</search>
<bounding>
    <data shape="0">
    <data faces="0 1 2 3 4 5">
</bounding>
<slider>
    <data name="Door 1 Side">
    <data shape="0">
    <data vector="1 0 0">
    <data position="220 221 222 223">
    <data vertices="220 221 222 223 500 501">
</slider>
<plan>
    <data shape="0">
    <data faces="22 23 24 25 26 27 28 29 30 31">
</plan>
```

In certain embodiments, the 3D model file and the accompanying descriptor file are combined into a single custom or proprietary file for each pre-designed room component. For example, the 3D model data, the construction drawing geometry and data, and the other embedded information or metadata can be included in a single custom file, for example within an SQL database. In certain embodiments, the embedded information, or metadata, is implemented using extra polygons in either the 3D model file and/or the descriptor file or in a single proprietary database file that includes the 3D geometry data as well as the metadata.

In certain embodiments, the component database 110 includes ratings data 275 supplied by the composition architects 120 and/or the home buyers 125. The ratings data 275 can include an aggregate user rating indication (such as a number on a scale of 1 to 10 or a number of stars on a scale of one to five stars) based on ratings or reviews received from one or more users. In certain embodiments, the ratings data 275 comprises textual reviews that can provide feedback from composition architects 120 or home buyers 125 who have previously used a particular pre-designed room component in the component database 110.

In certain embodiments, the ratings data 275 can be used to update a user rating in the properties metadata portion of the descriptor file and/or can be included as metadata associated with the room component itself. The ratings data 275 can illuminate certain qualities of the room component not made clear in a design architect's description of the room component. For example, if a design architect 115 designs a room component that tends to have a leaky roof, the ratings data 275 can include user reviews that provide a warning to potential future users. The ratings data 275 can also be used to improve the design of existing room components. For example, the design architect 115 of the leaky roof component can be notified of the poor reviews and modify the design to fix the flaws of the previous design. In certain embodiments, the ratings data 275 cannot be modified by the component design architect 115 of the pre-designed room component.

With continued reference to FIG. 2, the component database 110 includes cost data 280. The cost data 280 can include metadata relative to the total cost of construction of the pre-designed room component and/or data relative to the total cost of ownership of the pre-designed room component. The total cost of ownership can include the cost of construction as well as the costs associated with ownership of the component, such as costs of maintenance, energy costs, and the like. In certain embodiments, the total cost of construction of a particular room component may be relatively low, but the energy usage of the room component can lead to a high cost of ownership that a home buyer 125 may want to take into account.

The cost data 280 can be initially input by the design architect 115. The cost data 280 can be adjusted by the composition architects 120 and/or by the home buyers 125 to reflect the actual costs of construction and/or ownership. The actual cost may vary greatly depending on how the room component is integrated with the overall house design, who built it, and where it was built; however, the cost data 280 can provide a rough estimate for comparison with other room components in making selections. In certain embodiments, the cost data 280 is included in the properties metadata of the descriptor file and can be modified post-design as it is used in actual house designs. The cost data 280 can be adjusted to reflect the average cost of construction and/or ownership in a particular zip code.

The component database 110 further includes design rules data 285. The design rules data 285 can include compulsory design rules data or suggested design rules data. The design rules data can include parameter criteria indicative of at least one design policy. The compulsory design rules data may include, for example, data related to design requirements or limitations of a particular zip code, city, or neighborhood; electrical wiring requirements; plumbing requirements; drainage requirements; building code requirements; public safety requirements (such as fire code requirements or electrical code requirements); ADA requirements; and the like. The suggested design rules data may include stylistic suggestions to improve uniformity, aesthetic qualities, reduced cost alternatives, well-known heuristic rules of construction, and the like. In certain embodiments, the design rules data 285 is periodically updated. In certain embodiments, the room components include design rules metadata to indicate particular design rules that the room components satisfy, as described in more detail above.

The 3D composition software can be programmed, for example, using C++, with the OpenGL library being used for the 3D drawing aspects and the Qt library being used for the graphical user interface aspects. The 3D composition software can be compiled for, or supported by, WINDOWS, MAC, and/or LINUX operating systems. The 3D composition software can include one or more modules configured to be executed by one or more processors on the server 105 (not shown) and/or by one or more processors 310 on a remote computer 230.

As shown in FIGS. 2 and 3, the composition software includes a pre-designed room component search module 240, a component combination module 245, a verification module 250, a construction drawings module 255, and a combined properties calculation module 260. Fewer or additional modules can be included in alternative embodiments without departing from the spirit and/or scope of the disclosure.

In certain embodiments, the pre-designed room component search module 240, upon execution by a processor, identifies the pre-designed room components from the database 110 that match input criteria (e.g., search terms of a keyword search query or drop-down list selections) received from a user through an input device 315 (e.g., keyboard, mouse) and outputs search results to a display 315 (e.g., computer monitor).

In certain embodiments, the component combination module 245, upon execution by a processor, loads a 3D model of the selected pre-designed room component into a 3D workspace of a graphical user interface. The component combination module 245 can be used to modify or adjust parameters of the pre-designed room component and to align the 3D model of the pre-designed room component with other pre-designed room component models to create a complete design (e.g., using a composition tool of a user interface). As the room component models are aligned and modified in the 3D workspace, the associated metadata, or embedded information, is updated by the component combination module 245.

In certain embodiments, the verification module 250 verifies that the actions performed by the composition architect 120 during the composition phase and/or that the final architectural design complies with design policies. The design policies can comprise embedded parameter criteria of the room components or external predetermined design rules (e.g., design rules data 285).

In certain embodiments, the verification module 250 comprises at least two verification modules. For example, the verification module 250 can include a composition verification module and a final verification module. In other embodiments, the functions performed by the composition verification module and the final verification module can be combined into a single verification module.

The composition verification module, upon execution by a processor, can verify that actions performed by the composition architect 120 during the composition phase comport with design policies. For example, the composition verification module can determine whether two room components are capable of being merged. For example, the composition verification module can receive input criteria regarding the arrangement of room components and can determine whether or not embedded information within the room components (e.g., interaction metadata) allows the room components to be merged together according to the desired arrangement specified by the input criteria.

The final verification module, upon execution by a processor, can verify that the final house design complies with design policies. The design policies can be compulsory or suggested/recommended. For example, the design policies can be configured to verify that the house design does not violate building code requirements within a particular zip code or covenants, codes and restrictions of a particular neighborhood. In certain embodiments, the final verification module can also improve or optimize the final house design (e.g., reroute pipes, electrical wires, ventilation pathways, and the like). In other embodiments, the final verification module can provide suggestions for improving the final house design, such as indicating that the house design is missing a room component that is normally included in a completed house design, such as a bathroom.

In certain embodiments, the construction drawings module 255, upon execution by a processor, generates construction drawings and documents based on the three-dimensional completed model created by the component combination module 245. The construction drawings are generated from the merged construction drawings data of each of the individual room components 112. The construction drawings module 255 can generate a plan and/or other drawings of the completed composition (e.g., bitmap images) that are stored in memory on the remote computer 230. In certain embodiments, the construction drawings comprise 2D drawings. In other embodiments, the construction drawings comprise 3D drawings. In yet other embodiments, the construction drawings comprise 2D and 3D drawings.

In certain embodiments, the construction drawings module 255 generates detailed construction drawings and/or related documents sufficient to enable a contractor to build the house as designed by the composition architect 120. For example, the construction drawings can include architecture and all engineering discipline drawings, including a cover sheet, an index sheet, a symbol and abbreviations sheet, a site plan, a safety plan, a code review sheet, proposed construction details, and schedule sheets. The construction drawings can be transmitted to a printer, which can output the construction drawings on paper. In other embodiments, the completed 3D model files can be exported to a 3D printer to create physical 3D models of the completed house design.

The combined properties calculation module 260, upon execution by a processor, can output property values associated with the completed house design. For example, the combined property values can include total square footage, total cost of construction, estimated total energy usage, and the like. The combined property values can be continuously updated during the composition phase (e.g., as new room components are added or removed or as parameters of the room components are modified). Many combined property values can be calculated by summing the values of each of the individual room components, as included in each room component's cost metadata, with some possible further adjustments. For example, the combined properties calculation module 260 can determine that, when used together, the two components have a total combined cost that is 10% less than the sum of their individual cost values based on user-reported actual cost data. As another example, the actual total energy use of two merged room components can be less than the straight sum of the individual energy use values.

In certain embodiments, the composition software described herein advantageously results in an efficient and cost-effective design process in which construction drawings are generated for a customized home that more closely fits the particular requirements of the home buyer than a tract home. An illustrative component-based housing design process performed by the modules of the composition software will be discussed in more detail below, in conjunction with the description of FIGS. 4A and 4B.

With reference to FIG. 3, the remote computer 230 can include a processor 305, memory 310, one or more input/output devices 315, one or more multimedia devices 320, and a display 325. In general, the processor 305 receives user input (e.g., commands, text) and controls and transmits output (e.g., 3D models, construction drawings) through the input/output devices 315 (e.g., a printer) and the display 108. In certain embodiments, the processor 305 comprises a general or a special purpose microprocessor. The processor 305 can comprise an application-specific integrated circuit (ASIC) or one or more modules configured to execute on one or more processors.

The processor 305 can communicate with the memory 310 to retrieve and/or store data and/or program instructions for software and/or hardware. The memory 310 can comprise any type of memory capable of storing data, including, for example, random access memory (RAM), read-only memory (ROM), on-chip or off-chip memory, cache memory, or other more static memory such as magnetic or optical disk memory.

The input/output devices 315 can comprise a keyboard, a mouse, a microphone, a touch screen, a trackball, a touch pad, combinations of the same, or any other input device for inputting information to a processor. User input to the processor 305 can comprise data (e.g., 2D image data, 3D image data, voice data, text data), user commands (e.g., keyboard, mouse, or touch commands), combinations of the same and the like.

The display 320 can have any suitable construction for displaying information, such as a computer screen (e.g., a cathode ray tube monitor, an LCD screen), a television screen, or a handheld device screen. The display 320 can be used to render a graphical user interface generated by the 3D composition software. The graphical user interface will be discussed further in connection with FIG. 5.

Figure 4A:
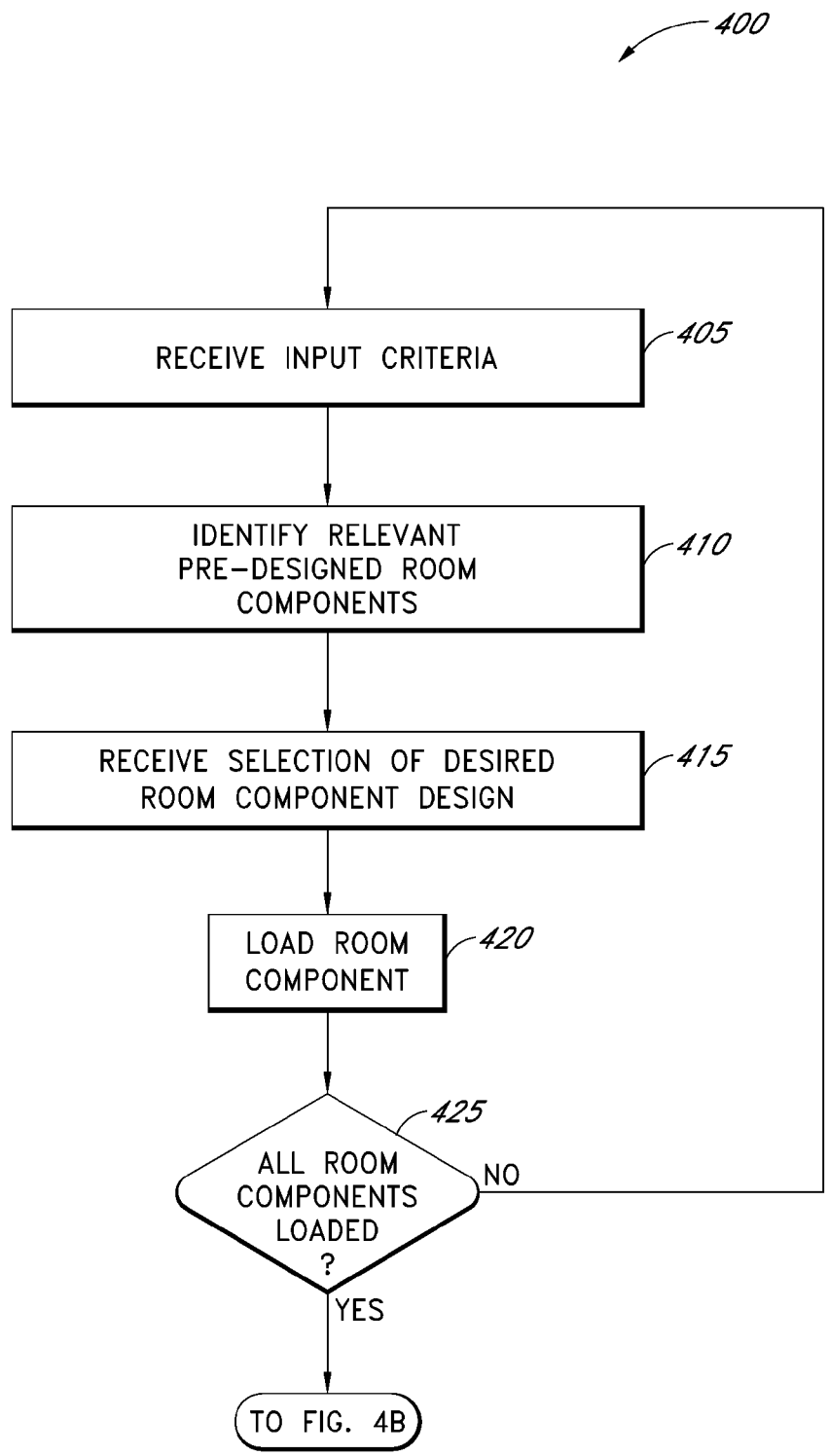
FIGS. 4A and 4B illustrate a flowchart of an embodiment of a component-based housing design process executable by the component-based housing design systems of FIGS. 1-3.
Figure 4B:
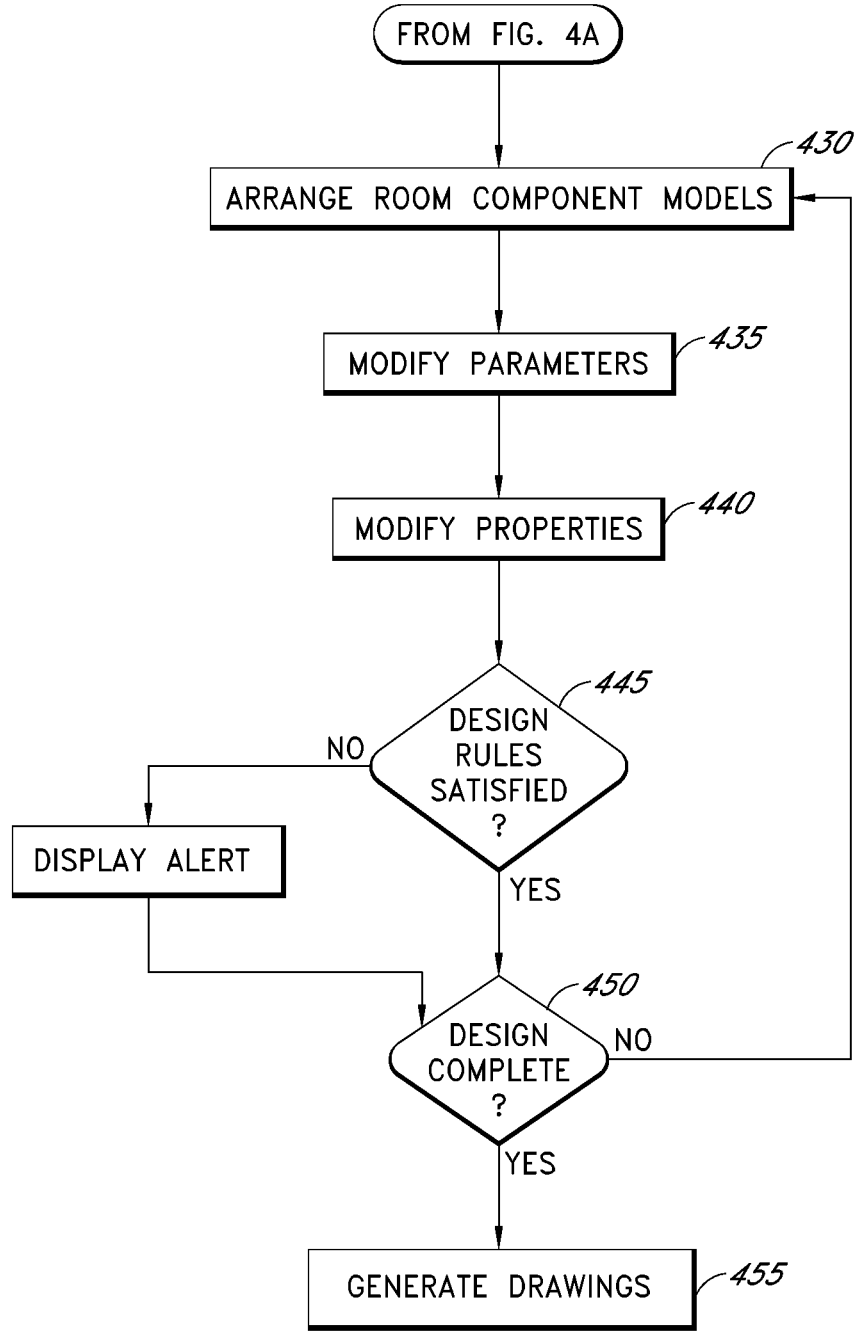

FIGS. 4A and 4B illustrate a flowchart of an embodiment of a component-based housing design process 400 for generating a complete design of a customized residential structure from a plurality of pre-designed room components. In certain embodiments, the component-based housing design process 400 can be executed by the component-based housing systems described above to design a customized house and to generate construction drawings of the customized house design.

Figure 6:
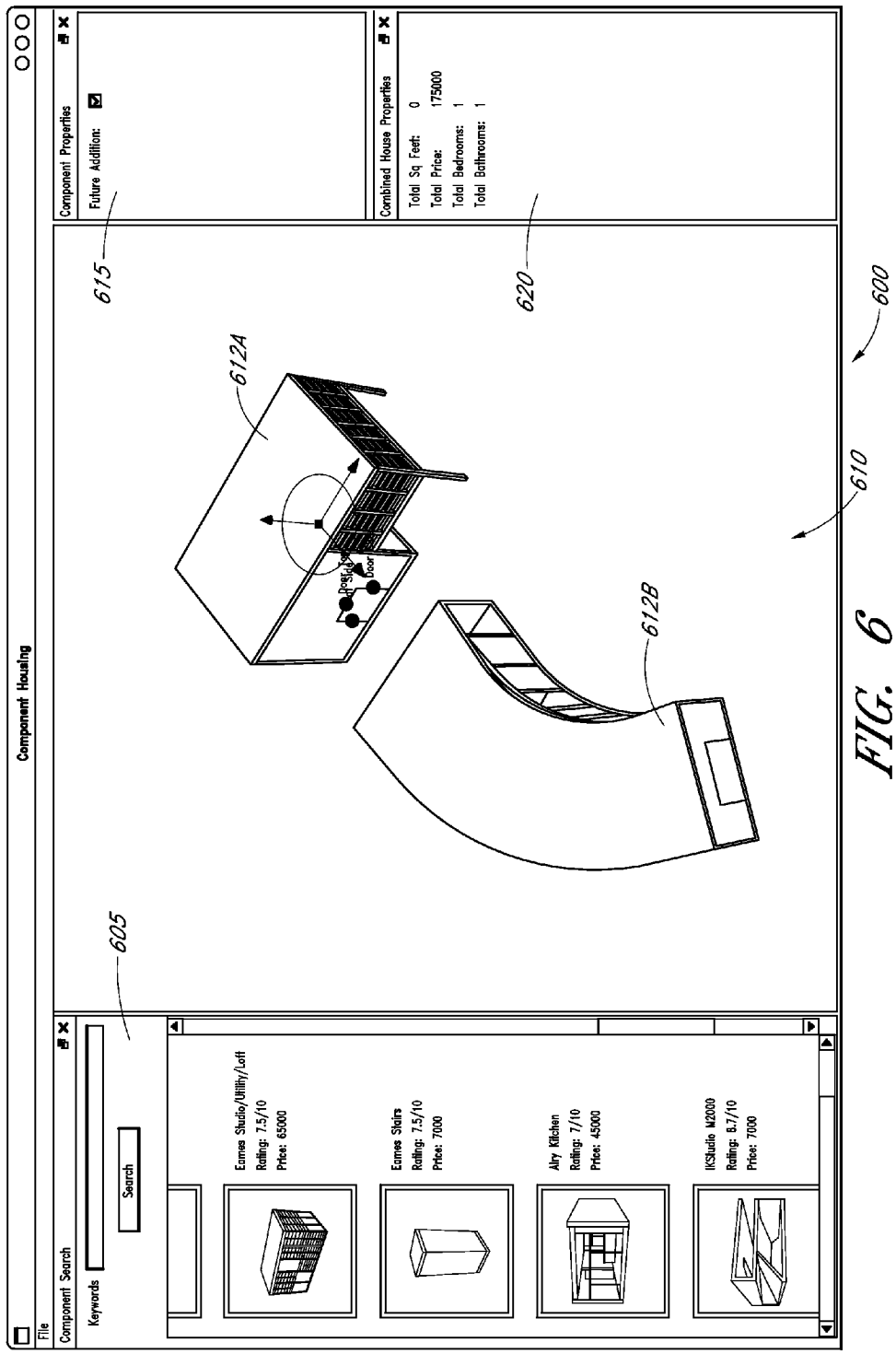
FIG. 6 illustrates an embodiment of a user interface of a component-based housing design tool usable with the system of FIGS. 1-3.

For illustrative purposes, the component-based housing design process 400 will be described herein with reference to the components of the component-based housing design system 300. For example, the various blocks of the component-based housing design process 400 will be described as being executed by the processor 305. Reference will also be made to a graphical user interface, an example of which is shown in FIG. 6.

As shown in FIG. 4A, the component-based housing design process 400 begins with Block 405, where the processor 305 receives input criteria associated with architectural or design preferences of a user from a user input device 315, such as a keyboard, mouse or microphone. The input criteria can include for example, square footage; projected cost; keywords, such as modern, airy, enclosed, and colorful; materials, such as bamboo or stained concrete; traditional styles, such as Georgian columns; energy use or carbon footprint; zip codes in which the component has already been pre-approved to meet local design codes; ceiling height; projected durability; handicap access; time required to build; and the like.

In certain embodiments, the input criteria (e.g., search parameters) can be received via a text entry field on a graphical user interface (as illustrated in FIG. 7). In other embodiments, the input criteria can be received by a microphone in conjunction with speech recognition software. In yet other embodiments, the input criteria can be received through the selection of options using a mouse (e.g., from a drop-down list or selection of buttons on a graphical user interface).

At Block 410, the processor 305 identifies relevant pre-designed room components 112 in the component database 110 based on the entered search parameters and returns the results of the search on the display 320 using, for example, the pre-designed room component search module 240. In certain embodiments, if a user searches for multiple terms, only pre-designed room components matching all terms will be returned as results to the search query.

In certain embodiments, the processor 305 automatically filters out "unusable" results based on the design rules data 285. For example, the processor 305 can filter out room components that would not be approved for a particular zip code so that the room components are not presented to the user. The results can be displayed in a list form and can be arranged by relevance, cost, date created, user ratings, and/or other parameters. The results can include a preview thumbnail image of each of the identified pre-designed room components.

At Block 415, the processor 305 can receive a selection of a desired room component by the composition architect 120 from a user input device 315 (e.g., by clicking on a preview image using a mouse). At Block 420, the processor 305 can load a 3D model of the pre-designed room component into a 3D workspace of a graphical user interface on the display 320 using, for example, the component combination module 245. In certain embodiments, the graphical user interface is a component of a 3D composition tool generated by the composition software.

If additional pre-designed room components are desired (Block 425), the component-based housing design process 400 can return to Block 405. If models of all the desired pre-designed room components have been loaded (Block 425), the component-based housing design process 400 proceeds to Block 430 (FIG. 4B).

At Block 430, the processor 305 receives input regarding a desired arrangement of the pre-designed room component models. For example, the processor can receive commands or graphical user interface tool instructions as the pre-designed room component models are arranged, modified, aligned, or otherwise manipulated in the 3D workspace by the composition architect 120.

As the pre-designed room component models are arranged at Block 430, the verification module 250 (e.g., the composition verification module) can verify that boundaries of two pre-designed components are capable of being merged together (e.g., based on embedded parameter criteria or interaction metadata indicative of at least one design policy or based on the design rules data 285). For example, a first wall formed of one type of construction may not be able to be merged in real life construction with a second wall formed of a dissimilar, non-compatible construction. Accordingly, the verification module 250 can provide an indication (e.g., warning, prompt, or alert) that the merging of the components is not proper. In certain embodiments, the verification module 250 prevents the non-compatible component features from being merged in the 3D workspace of the graphical user interface.

At Block 435, the processor 305 receives input criteria (e.g., commands or graphical user interface tool instructions) to modify parameters of a pre-designed room component (e.g., dimensions, angles, and/or other structural features). The input criteria can include adjustment of vertices of a structural feature, face, or boundary of the pre-defined room component models by the composition architect 120 in the 3D workspace. For example, a door opening or window can be configured to be adjusted parametrically to be wider or narrower by clicking on a control handle and moving it along a horizontal vector. If none of the room components includes parametrically-adjustable elements or features, Block 435 can be skipped.

At Block 440, the processor 305 modifies or adjusts properties or characteristics of the pre-designed room components. The processor 305 can automatically adjust the properties or characteristics based on predetermined design policies or can adjust the properties or characteristics based on manual input criteria (commands or instructions) received from the composition architect 120. For example, the pre-designed room components can include options (e.g., flooring type, roof type, exterior surface finishing, materials) established by the component design architect 115 that can be selected by the composition architect 120.

Automatic adjustment of properties can include, for example, automatic electrical routing, pipe routing, or ventilation routing throughout the merged pre-designed room components. For example, after two or more room components have been merged, the processor 305 can automatically reroute the electrical wiring, plumbing, and/or ventilation to have an improved configuration.

Manual adjustment of properties can include adjustment of material composition, color, structural properties, and/or other aesthetic or stylistic qualities. Manual adjustment of properties can be made through text entry, selection from drop-down list options, speech recognition, combinations of the same, or the like. For example, the ceiling can be toggled between a ceiling plane designed to have another story placed atop it and a vaulted ceiling. The roof type can be adjusted (manually or automatically) to correspond to the type of ceiling. In certain embodiments, the properties can be continuously updated, adjusted and/or modified throughout the component-based housing design process 400.

At Block 445, the processor 305 verifies that design rules and/or requirements are satisfied by the finalized or completed house design using, for example, the verification module 250 (e.g., the final verification module). The verification module 250 can perform the verification based on the design rules data 285. If design rules have been violated, the processor 305 can provide an alert and/or warning (Block 448) to the composition architect 120.

The alert and/or warning can comprise a visual and/or audible warning. Some alerts and/or warnings can indicate that a mandatory change is required. Other alerts and/or warnings can indicate a recommended or suggested change. The visual warnings can include a text message to the consumer describing the conflict and explaining how it can be resolved.

For example, the verification module 250 can provide an alert if the current design would result in poor drainage, would result in a structurally unsound design, would not comply with earthquake guidelines, or would violate design heuristics. The alert can prompt the composition architect 120 to modify the design until the design rules or policies are satisfied, and the alert is removed. As another example, the verification module 250 can provide an alert if the current house design does not include a room component that is typically included in a completed house design, such as a bathroom or garage.

In certain embodiments, the processor 305 automatically resolves the conflict or violation according to predetermined design rules or policies without requiring any action by the composition architect 120. For example, as discussed above, the processor 305 can automatically route or re-route the electrical wiring, piping, and/or HVAC routes in an efficient manner.

At Block 450, the processor 305 determines whether the design is complete. If the design is not complete, the component-based housing design process 400 can return to Block 430. If the design is complete, the processor 305 generates construction drawings from the completed three-dimensional house model using, for example, the construction drawings module 255. The construction drawings can be saved as a digital file and can be sent to a printer to output the drawings on paper. In other embodiments, a small-scale 3D model of the completed house design can be generated using a 3D printer.

In certain embodiments, the component-based housing design process 400 can return to Block 405 at any point in the process in order to select new room components to potentially be used in the housing design.

Figure 5:
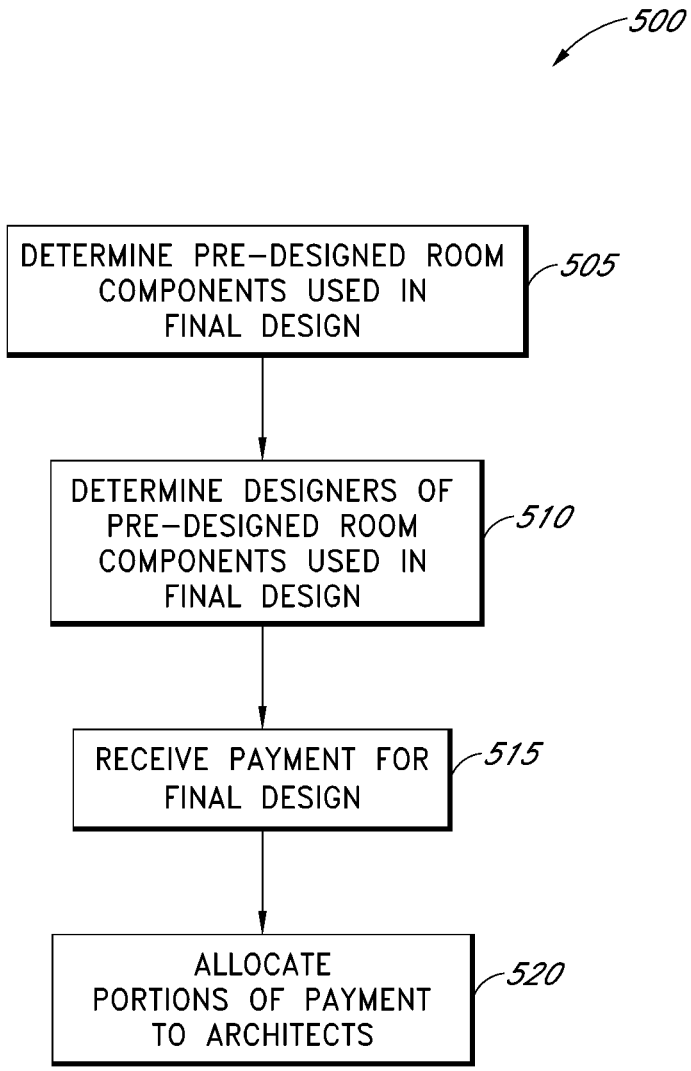
FIG. 5 illustrates a flowchart of an embodiment of a fee allocation process executable by the component-based housing design systems of FIGS. 1-3.

FIG. 5 illustrates a flowchart of a fee allocation process 500 usable by the component-based housing design systems of FIGS. 1 to 3. In certain embodiments, the fee allocation process 500, upon execution by a processor, automatically allocates portions of the total fee paid by the home buyer 125 to the design architect 120 and the composition architect 125. For illustrative purposes, the fee allocation process 500 will be described with reference to the component-based housing design systems 100, 300 of FIGS. 1 and 3.

The fee allocation process 500 begins at Block 505, wherein the processor 305 determines the pre-designed room components used in the final house design. At Block 510, the processor 305 determines the design architects 115 of each of the pre-designed room components used in the final design, as determined at Block 505. In certain embodiments, the pre-designed room components can include a design architect identifier that can be extracted by the processor 305.

At Block 515, the processor 305 can receive the total payment for the final design from the home buyer 125 through online payment methods (e.g., via credit card or e-check). At Block 520, the processor 305 can automatically allocate portions of the total payment to the design architects 115 of each of the pre-designed room components identified at Block 510 and to the composition architect 120. For example, the design architects 115 of each of the room components used in the final design can automatically receive a flat fee (e.g., $100). If a design architect 115 designed multiple room components used in the final design, a flat fee can be allocated for each of the room components. The composition architect 120 can be allocated an hourly fee based on the time spent with the home buyers 125 (which may be logged and recorded by the processor 305) or can be allocated a flat fee. In certain embodiments, at least one of the design architects 115 can be the composition architect 120.

In certain embodiments, the component-based housing systems described herein can store deposit account information for each of the component design architects 115 and each of the composition architects 120. The deposit account information can be collected, for example, during an account registration process.

FIG. 6 illustrates an embodiment of a user interface 600 depicting an example component-based housing design tool usable by the systems of FIGS. 1-3. In certain embodiments, the user interface 600 advantageously allows for a composition architect 120 or other user to quickly search for pre-designed room components, load desired room components into a 3D workspace, and arrange and align the room components to create a complete customized house design within a matter of minutes or hours.

As shown, the user interface 600 comprises a screen display having a component search window 605, a 3D workspace 610, a component properties window 615, and a combined house properties window 620. In general, the component search window 605 can be used to perform keyword searches in order to locate room components of interest and to select pre-designed room components from the search results to load into the 3D workspace 610. The component search window 605 will be described in more detail in connection with FIG. 7.

The 3D workspace 610 is the main window of the user interface 600 and can display models of the pre-designed room components selected in the search query window 605 and loaded by the component combination module 245 for manipulation by the composition architect 120. As shown, the 3D workspace 610 includes two loaded pre-designed room components 612A, 612B. The pre-designed room component 612A includes a large multi-use room, loft, and a covered patio and the pre-designed room component 612B includes a living room, a bedroom, a kitchen, and a bathroom. Manipulation and alignment of the pre-designed room components 612 in the 3D workspace 610 will be described in more detail in connection with FIG. 8A.

The component properties window 615 displays properties specific to a selected room component in the 3D workspace 610. In certain embodiments, the component properties window 615 can be used to select and/or adjust attributes or properties of the selected room component (see Block 440 of FIG. 4B). For example, as shown in FIG. 6, the component properties window 615 allows the composition architect 120 to mark the selected room component as a future addition. In certain embodiments, plans are generated for the house without the selected room component and additional plans are generated for the selected room component as an addition to the house.

In other embodiments, certain room components can define specific structural elements (e.g., doors or windows) that can be toggled in and out of the design by using check boxes in the component properties window 615. In yet other embodiments, the component properties window 615 can include drop down lists that allow the composition architect 120 to select between alternative properties, such as alternate exterior cladding, roof/ceiling type, composition materials, colors, and the like.

The combined properties window 620 displays properties of the aggregate house structure made up of all the room components currently loaded in the 3D workspace 610. The combined properties calculation module 260, upon execution by the processor 305, can extract the properties data from the XML descriptor files of each of the room components, and can calculate the final properties of the completed house. The combined properties window 620 can display properties such as total price, total square footage, number of bedrooms, number of bathrooms, approximate construction time, total estimated energy use. In certain embodiments, the properties in the combined properties window 620 can be continuously updated as the composition architect 120 composes the customized house design.

The file drop-down menu depicted at the top of the user interface 600 can allow the composition architect 120 to load 3D model files into the 3D workspace 610 without having to access them through the component database 110. This feature can be used, for example, to allow the composition to import shapes or designs that can be used to experiment with different design options without performing a search. The files loaded in this manner do not support the features of the composition software that depend on the room component's XML descriptor file and preferably are not used in the actual design. The file drop-down menu can also include an option that allows the composition architect 120 to delete room components from the 3D workspace 610. The file drop-down menu can also include an option that initiates execution of the construction drawings module 255 by the processor 305 upon selection by the composition architect 120.

The component search window 605, the component properties window 615, and the combined house properties window 620 can be arranged or displayed based on user preferences and are not limited to the display shown in FIG. 6. As shown, the various windows can be minimized or closed by the composition architect 120. In other embodiments, the user interface 600 and/or the various windows can comprise more or less information than what is shown in FIG. 6.

FIG. 7 illustrates an example search query performed in the component search window 605. As shown, the component search window 605 includes a text entry field 614 in which a user can type search terms and a button 616 to activate the search. Upon activation of the button 616, the pre-designed room component search module 240, upon execution by a processor, can search the database 110 of pre-designed room components 112 and return relevant results based on the search terms entered in the text entry field 614. The pre-designed room component search module 240 can return results based on correspondence of the search terms entered in the text entry field 614 with the search terms listed in the search terms data of the descriptor files of the pre-designed room components.

As shown, the keyword "concrete" has been entered in the text entry field 614. The component search window 605 includes a results window 617 that displays the search results returned by a search for concrete. As shown, the search results can be displayed as preview thumbnail images in the results window 617 below the text entry field 614. In certain embodiments, various attributes from the descriptor file can be included adjacent to the thumbnail images. For example, the search results can list the name of the room component, its user rating, and its construction price (as shown in FIG. 7). In certain embodiments, the name of the designer can be displayed. More or fewer component attributes can be displayed in alternative embodiments. The composition architect 120 can load desired room components into the 3D workspace 610 by clicking on the thumbnail images. Any number of room components can be loaded into the 3D workspace 610. The thumbnail images can be a 2D photo or image or a 3D model that the user is able to explore and manipulate.

FIG. 8A illustrates the pre-designed room component 612A loaded into the 3D workspace 610. When the composition architect 120 selects a room component (e.g., room component 612A) in the 3D workspace 610, a manipulator 618 is displayed at the center of the room component. The manipulator 618 allows the composition architect 120 to click on different axes to drag and move the room component along that axis, or along the ground plane if the center handle, or origin, is selected. The room component 612A can be rotated by clicking on and dragging the ring surrounding the manipulator 618. In certain embodiments, the manipulator 618 enables motion having six degrees of freedom (e.g., translation in three perpendicular axes combined with rotation about three perpendicular axes).

In certain embodiments, the pre-designed room components can include elements that can be adjusted parametrically. These elements can be defined, for example, in the parametric adjustment data of the descriptor file (e.g., the slider tag of the example XML descriptor file included above). As shown, the pre-designed room component 612A includes a parametrically-adjustable wall opening 619. The vertices of the opening can be adjusted to make the wall opening wider, narrower, taller, or shorter.

When a room component is selected, a control handle can be displayed on each of the adjustable vertices of the parametrically-adjustable element. As shown, the parametrically-adjustable wall opening 619 includes three control handles (illustrated as black circles) with accompanying text labels. The dimensions of the parametrically-adjustable wall opening 619 can be adjusted by clicking and dragging on the control handles. In certain embodiments, the control handles are dragged along the vectors specified by the design architect 115 of the pre-designed room component in the parametric adjustment data of the descriptor file.

Figure 8B:
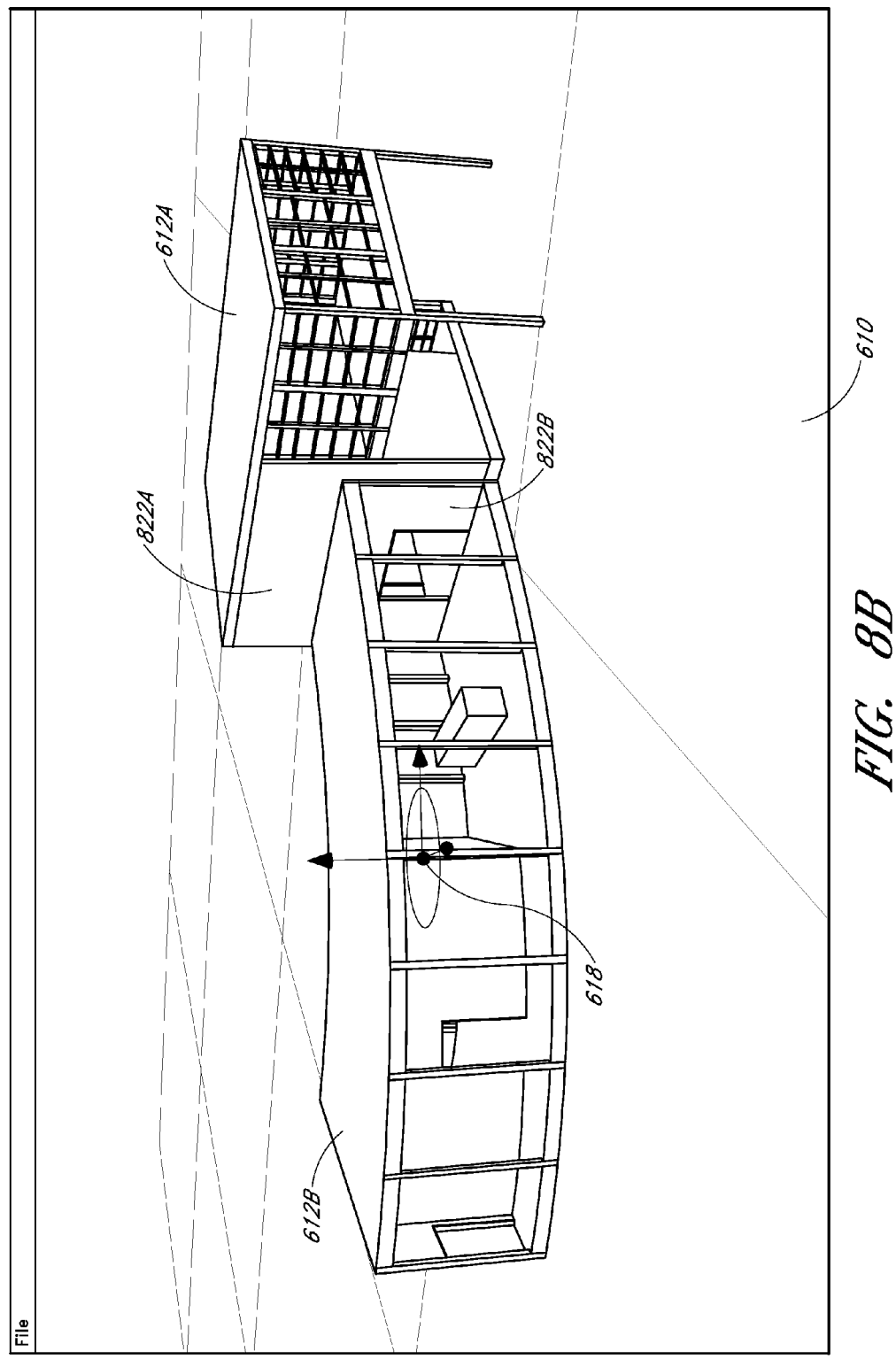
FIG. 8B illustrates an embodiment of two room component models merged together within the workspace of the user interface of FIG. 6.

FIG. 8B illustrates two pre-designed room components 612A, 612B after being merged by the composition architect 120 in the 3D workspace 610. The walls of each of the room components 612A, 612B that are capable of interacting or merging with walls of other room components can be defined in each room component's descriptor file (e.g., by the interaction metadata in the bounding tag of the example XML descriptor file included above). When an interactive wall of one room component is positioned near the interactive wall of another room component, the component combination module 245 can be configured to snap the interactive walls of the two room components together such that they are aligned and the composition architect 120 knows that the two room components have been merged. As shown, the room components 612A, 612B have been merged such that their respective wall openings have been aligned to form a pathway between the two room components.

In certain embodiments, each wall or other structural boundary element of a room component is configured to merge (e.g., snap, glue) with any wall or other structural boundary element of any other room component. In other embodiments, a particular wall can be configured to merge only with other walls of similar dimensions and/or construction, thereby ensuring that the two room components could be merged in real-life construction.

In certain embodiments, each wall or structural boundary element is represented internally as a single low-resolution polygon ("wall" polygon) for simplified interaction and manipulation by the software algorithms executed by the modules of the composition software. As two room components are merged together, the "wall" polygons of the merged room components simply overlap. If the merged walls of two room components have different wall thicknesses, the larger of the two wall thickness values can be used for the merged wall. In certain embodiments, the "wall" polygons are used by the construction drawings module 255 to generate 2D construction plan drawings.

In other embodiments, the component combination module 245 can employ Boolean or like 3D modeling algorithms to unify the multiple, complex 3D polygons that make up multiple room component models. The resulting 3D model can be used to make physical 3D models, 3D prints, or renderings of the completed house design.

In other embodiments, a camera feature can be implemented to allow a camera to be inserted into the room component models. The composition architects 120 can move the camera inside the room component models to show the client around the house from a first-person perspective. Additionally, automatic camera placement techniques could be used to automatically create renderings of a completed house design.

Figure 9:
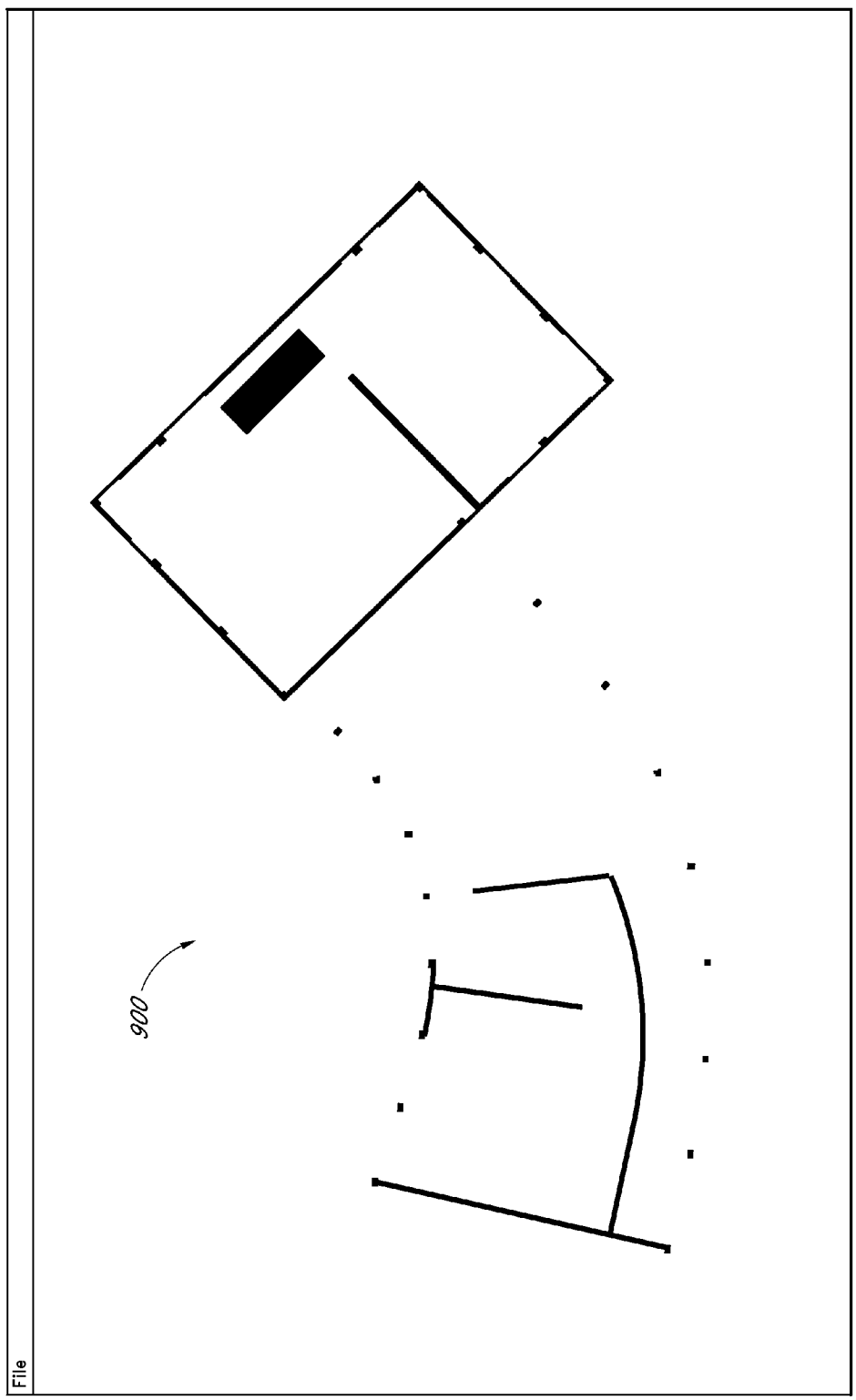
FIG. 9 illustrates an example of a two-dimensional construction plan drawing generated by the component-based housing design systems of FIGS. 1-3.

FIG. 9 illustrates a construction plan drawing 900 generated from the composition of the two room components merged together in FIG. 8B. In certain embodiments, the construction plan drawing 900 can be generated using OpenGL drawing commands at low resolution. The construction plan drawing 900 can be drawn based on specially-marked polygons included in a room component's 3D model file. The construction plan drawing 900 is generated by merging the construction drawings data of the room component 612A and the room component 612B together. As described above, more detailed construction drawings can be generated to allow a contractor to build a house as designed in the 3D workspace 610.

Figure 10:
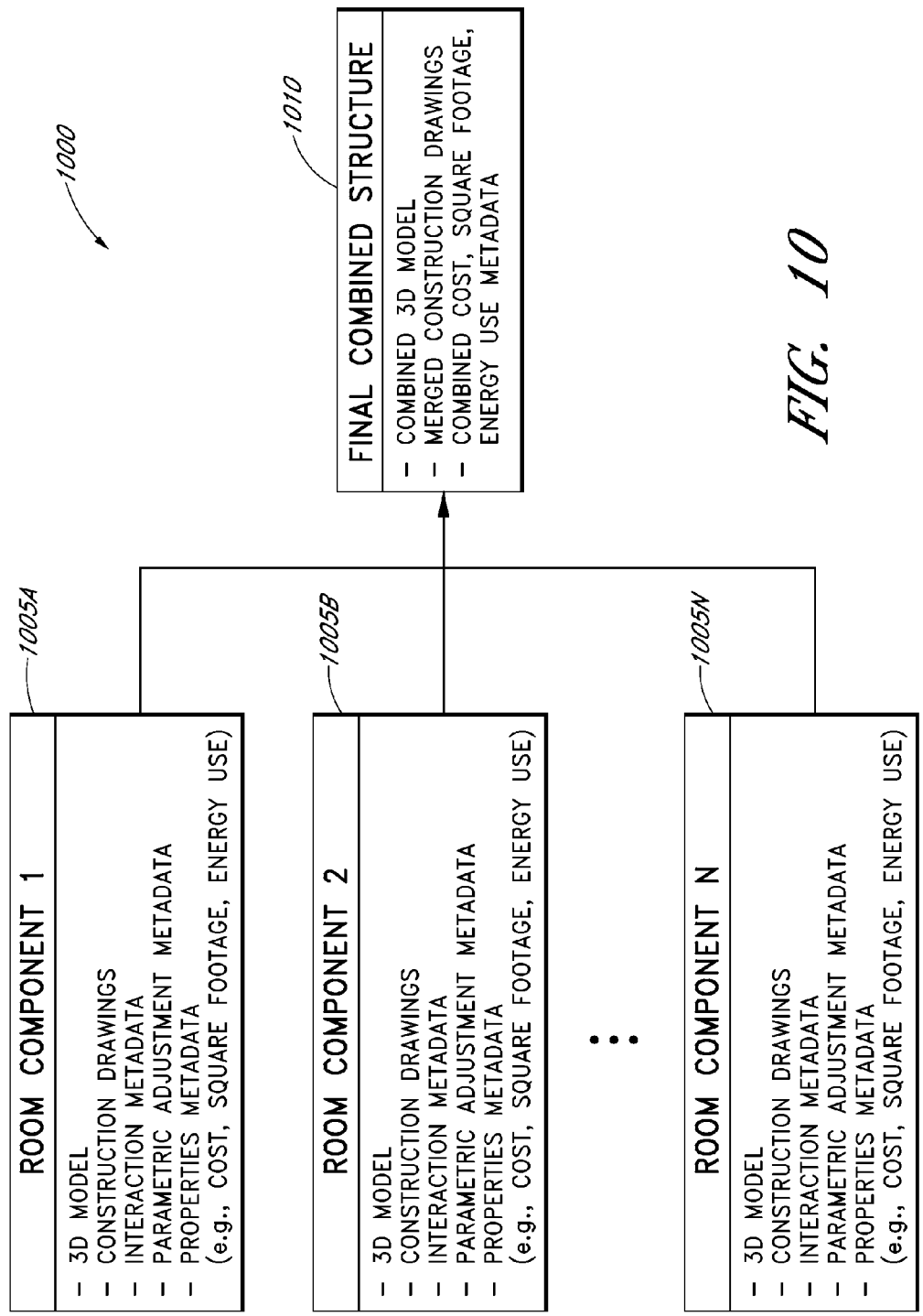
FIG. 10 illustrates a process for merging data of pre-designed room components according to certain embodiments of the invention.

FIG. 10 illustrates the merging of data of pre-designed room components by the composition software as a result of the merging of the pre-designed room components by the composition architect 120 in the 3D workspace 610. In certain embodiments, the merging of the data occurs in real-time as the composition architect 120 merges each of the room components together. In other embodiments, the merging of the data occurs upon completion of the final architectural design. In still other embodiments, the merging of the data occurs both in real-time and upon completion of the final architectural design.

As shown, the composition module(s) executing on one or more computing devices can merge the data files 1005 of two or more room components together into a combined data file 1010 of the final combined structure. Each of the room component data files 1005 can include 3D model geometry data, construction drawings geometry and data, interaction metadata, parametric adjustment metadata, and properties metadata (e.g., cost, square footage, energy use metadata) as described herein. The room component data files 1005 can also include any of the other categories of data, metadata, and/or embedded information described herein but not shown in FIG. 10. In certain embodiments, the data files 1005, 1010 comprise multiple data files or sub-files (e.g., a model file and a descriptor file).

In certain embodiments, the merging of the 3D model data of the room components is performed using Boolean operations. In certain embodiments, the merging of the construction drawings metadata is performed by overlapping the 2D drawings or polygons of the merged room components on top of each other and using routing algorithms for wiring, piping, and/or ventilation schemes. The merging of the construction drawings geometry and data can be based on the interaction metadata, the parametric adjustment metadata, and/or the properties metadata.

In certain embodiments, if wall widths of the merged room components are different (as specified by the metadata), the thickness of the merged wall of the combined structure can be the thicker of the two room component wall thicknesses. For example, if the metadata of a first room component specifies that a wall thickness is 4 inches and the metadata of a second room component specifies that a wall thickness is 6 inches, the merged wall in the construction drawings can have a thickness of 6 inches.

In certain embodiments, at least a portion of the properties metadata (for example, cost, square footage, and energy use) can be merged by combining the properties metadata of the individual room components together, as described herein. For example, the values specified by the properties metadata of the individual room components can be summed to generate the combined values. In other embodiments, the merging of the cost, square footage, and energy use metadata can take additional factors into account in calculating the combined values (e.g., actual user-reported values), or use the minimum or maximum value of a certain property.

The merging of the data files 1005 of the merged room components into a combined data file 1010 of the final combined structure can be performed via execution of any of the software modules described herein. For example, the merging of the 3D model data can be performed via execution of the component combining module 245, the merging of the construction drawing geometry and data can be performed via execution of the construction drawings module 255, and the merging of the cost, square footage, and energy use metadata can be performed by the combined properties calculation module 260.

The Appendix includes example embodiments of pre-designed room components and example embodiments of houses generated from one or more of the pre-designed room components. The entire content of the attached Appendix is expressly bodily incorporated by reference herein, and is part of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Depending on the embodiment, certain acts, events, or functions of any of the methods described herein can be performed in a different sequence, can be added, merged, or left out all together (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for creating customized architectural designs, the method comprising:
   as implemented by one or more computing devices configured with specific computer-executable instructions,
   receiving input criteria associated with a first architectural design preferences of a user;
   accessing at least one database storing a plurality of pre-designed room components to automatically identify one or more of the plurality of pre-designed room components that satisfy the input criteria, each of the pre-designed room components further comprising structural data indicative of a virtual three-dimensional (3D) model of a pre-designed room or group of connected rooms and embedded information comprising:
      interaction metadata defining an exterior boundary of the 3D model and including parameter criteria that define whether and where the 3D model can be connected to other pre-designed room component 3D models;
      parametric adjustment metadata indicative of structural boundary elements or openings of the 3D model that can be parametrically adjusted by a user;
      first properties metadata indicative of a square footage of a room or space included in the pre-designed room component;
      second properties metadata indicative of a construction cost of the predesigned room component;
      third properties metadata indicative of feedback from previous users of the pre-designed room component in an architectural design;
      fourth properties metadata indicative of a function of a room or space included in the pre-designed room component;
      and construction drawings metadata corresponding to the virtual 3D model indicative of construction documents for use in building a full-scale physical version of the pre-designed room component;
   displaying representative images of the identified pre-designed room components;
   receiving a selection of a first pre-designed room component from the identified pre-designed room components;
   loading the 3D model of the first pre-designed room component into a workspace of a user interface;
   receiving input criteria associated with a second architectural design preference of the user;
   accessing the at least one database to automatically identify one or more of the plurality of pre-designed room components that satisfy the input criteria associated with the second architectural design preference,
   receiving a selection of a second pre-designed room component from the identified pre-designed room components;
   loading the 3D model of the second pre-designed room component into the workspace of the user interface;
   receiving input regarding a desired merging of the 3D models of the multiple pre-designed room components in the workspace;
   determining, based on the interaction metadata of the first and second pre-designed room components, if the desired merging of the 3D models is allowable;
   when the desired merging of the 3D models is not allowable due to conflicts determined based on the interaction metadata between the first and second pre-designed room components, generating an alert identifying that the desired merging is not allowable; and when the desired merging of the 3D models is allowable, merging the 3D models and their corresponding properties metadata and construction drawings metadata based on the received input regarding the desired merging; and generating construction documents based on the merged construction drawings metadata for use in building a full-scale physical version of the merged 3D models.

2. The method of claim 1, wherein the pre-designed room components comprise single-room modules.

3. The method of claim 1, wherein the pre-designed room components comprise multiple rooms.

4. The method of claim 1, wherein said merging comprises displaying updated properties of the merged pre-designed room components in the user interface based on the merged properties metadata of the merged pre-designed room components.

5. The method of claim 1, wherein said merging comprises overlapping boundary polygons of structural boundary elements of the 3D models of the first and second pre-designed room components.

6. The method of claim 1, wherein said input criteria comprise one or more keyword terms.

7. The method of claim 1, wherein said merging comprises merging of the embedded information of the first pre-designed room component and the embedded information of the second pre-designed room component into a combined data file.

8. The method of claim 1, further comprising fourth properties metadata indicative of pre-approval of the pre-designed room component as meeting safety code or design requirements for a particular geographical region.

9. A system for component-based architectural design, the computer system comprising:

a centralized database of pre-designed room components, each of the pre-designed room components further comprising structural data indicative of a virtual three-dimensional (3D) model of a pre-designed room or group of connected rooms or spaces, embedded information comprising interaction metadata defining an exterior boundary of the 3D model and including parameter criteria that define whether and where the 3D model can be connected to other pre-designed room component 3D models, properties metadata indicative of a construction cost and square footage of the entire pre-designed room component, designer identification metadata indicative of a designer of the pre-designed room component, and construction drawings metadata indicative of the floor plan of the pre-designed room or group of connected rooms;

a server configured to communicate with a client computer over a network, the server further configured to:

receive input criteria associated with a first architectural design preference of a user;

access the centralized database to automatically identify one or more of the pre-designed room components that satisfy the input criteria;

receive a selection of a first pre-designed room component from the identified pre-designed room components;

transmit the 3D model of the first pre-designed room components to the client computer for loading within a workspace of a user interface;

receive input criteria associated with a second architectural design preference of the user;

access the centralized database storing the plurality of pre-designed room components to automatically identify one or more of the plurality of pre-designed room components that satisfy the input criteria associated with the second architectural design preference, receive a selection of a second pre-designed room component from the identified pre-designed room components associated with the second architectural design preference;

transmit the 3D model of the second pre-designed room component to the client computer for loading within a workspace of the user interface;

receive input regarding a desired merging of the 3D models within the workspace;

determine, based on the interaction metadata of the first and second pre-designed room components, if the desired merging of the 3D models is allowable;

when the desired merging of the 3D models is not allowable due to conflicts determined based on the interaction metadata between the first and second pre-designed room components, generate an alert identifying that the desired merging is not allowable; and when the desired merging of the 3D models is allowable, merge the 3D models and their corresponding embedded information and construction drawings metadata based on the received input regarding the desired merging; and generate construction documents based on the merged construction drawings metadata for use in building a full-scale physical version of the merged 3D models.

10. The system of claim 9, wherein the interaction metadata is configured to allow a first structural boundary element of the 3D model of the first pre-designed room component to snap to a second structural boundary element of the 3D model of the second pre-designed room component if the desired merging of the 3D models is allowable.

11. The system of claim 10, wherein the server further comprises a verification module configured to determine whether a final architectural design complies with predetermined design rules data stored in the centralized database.

12. The system of claim 11, wherein the server further comprises a construction drawings module configured to generate construction drawings of the final architectural design based upon a merging of the construction drawings metadata of the pre-designed room components of the final architectural design.

13. The system of claim 9, wherein the pre-designed room components comprise single-room modules.

14. A computer system for component-based architectural design, the system comprising:

a database storing a plurality of pre-designed room components, each of the pre-designed room components further comprising structural data indicative of a three-dimensional (3D) model of a pre-designed room or group of connected rooms, embedded information comprising interaction metadata defining an exterior boundary of the 3D model and including parameter criteria that define whether and where the 3D model can be connected to other pre-designed room component 3D models, designer identification metadata indicative of a designer of the pre-designed room component and construction documents metadata indicative of construction documents to be used to build the pre-designed room component or group of connected rooms;

a processor, the processor programmed to implement:
  a pre-designed room component search module configured to receive input criteria associated with architectural design preferences of a user and to access the database to automatically identify one or more of the pre-designed room components that satisfy the input criteria;
  a component combination module configured to receive user selections of one or more of the identified pre-designed room components and to load the 3D models of each of the pre-designed room components selected by the user into a workspace of a user interface;
  a verification module configured to receive input regarding a desired merging of the 3D models and to determine, based on the interaction metadata of the pre-designed room components selected by the user, if the desired merging of the 3D models is permissible;
  wherein when the desired merging of the 3D models is not allowable due to conflicts determined based on the interaction metadata, the verification module is configured to generate an alert; and
  wherein when the desired merging of the 3D models is allowable, the component combination module is configured to merge the 3D models based on the received input regarding the desired merging,
  wherein said merging comprises merging at least a portion of the embedded information and the construction document metadata of the pre-designed room components associated with the merged 3D models, and
  wherein the processor is further configured to:
    identify the pre-designed room components used in a final architectural design;
    identify designers of the pre-designed room components used in the final architectural design from the designer identification metadata;
    receive a total payment for the final architectural design; and
    initiate delivery of portions of the total payment to the identified designers of each of the pre-designed room components used in the final architectural design.

15. The computer system of claim 14, wherein the verification module is further configured to determine if a final desired arrangement of the 3D models violates predetermined design rules, wherein when the final desired arrangement of the 3D models violates the predetermined design rules, the verification module is configured to generate an alert identifying the violated predetermined design rules and when the final desired arrangement of the 3D models does not violate the predetermined design rules, the construction drawings module is configured to output final construction data for generating construction drawings.

16. The computer system of claim 14, wherein the database resides on a web server accessible via a network.

17. The computer system of claim 14, wherein the pre-designed room components comprise single-room modules.

18. The computer system of claim 14, wherein the embedded information further comprises properties metadata indicative of construction or ownership costs and square footage of the pre-designed room component, and wherein said processor is configured to implement a combined properties calculation module configured to update the properties metadata to reflect properties associated with the combined structure after the merging of the 3D models.

19. The computer system of claim 18, wherein the properties metadata comprises one or more of the following: design architect identification, identification of the function of the rooms contained within the room component, orientation properties, wiring information, plumbing information, square footage information, energy usage information, ratings information, and materials data.

* * * * *